(12) United States Patent
Anderson

(10) Patent No.: US 10,948,103 B2
(45) Date of Patent: Mar. 16, 2021

(54) METHODS AND APPARATUS TO MONITOR HEALTH INFORMATION OF A VALVE

(71) Applicant: FISHER CONTROLS INTERNATIONAL LLC, Marshalltown, IA (US)

(72) Inventor: Shawn William Anderson, Haverhill, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 126 days.

(21) Appl. No.: 15/883,474

(22) Filed: Jan. 30, 2018

(65) Prior Publication Data
US 2018/0231144 A1  Aug. 16, 2018

Related U.S. Application Data

(63) Continuation of application No. 15/429,685, filed on Feb. 10, 2017, now Pat. No. 9,915,375.

(51) Int. Cl.
*F16K 37/00* (2006.01)
*G08B 21/18* (2006.01)
*G05B 23/02* (2006.01)

(52) U.S. Cl.
CPC ...... *F16K 37/0083* (2013.01); *G05B 23/0235* (2013.01); *G08B 21/18* (2013.01); *G05B 2219/33326* (2013.01)

(58) Field of Classification Search
CPC ...... F16K 37/0083; G05B 2219/33326; G05B 23/0235; G05B 23/0283; F04B 53/10; F04B 2207/70; F01K 13/02; F15B 19/005
See application file for complete search history.

(56) References Cited

U.S. PATENT DOCUMENTS

| | | | | |
|---|---|---|---|---|
| 8,072,343 B2* | 12/2011 | Flanders | ............. | F16K 37/0083 137/487.5 |
| 8,786,455 B2 | 7/2014 | Perry et al. | | |
| 2003/0132850 A1* | 7/2003 | Ozawa | .................... | F25D 17/02 340/686.1 |
| 2008/0208429 A1* | 8/2008 | Saravanapriyan | ...... | F01K 13/02 701/100 |

(Continued)

OTHER PUBLICATIONS

United States Patent and Trademark Office, Non-final Office Action, issued in connection with U.S. Appl. No. 15/429,685, dated Jun. 30, 2017, 18 pages.

(Continued)

*Primary Examiner* — Mirza F Alam
(74) *Attorney, Agent, or Firm* — Hanley, Flight & Zimmerman, LLC

(57) ABSTRACT

Methods, apparatus, systems, and articles of manufacture to monitor health information of a valve are disclosed. An example system includes a field device in a process control network to monitor a valve, and a valve health monitor to be communicatively coupled to the field device to obtain operational health information from the field device when the valve is commanded to move from a first position to a second position, the first position opposite the second position, identify a condition of the valve based on the operational health information, and send an alert via the process control network based on the condition of the valve.

20 Claims, 16 Drawing Sheets

(56) References Cited

U.S. PATENT DOCUMENTS

| | | | |
|---|---|---|---|
| 2009/0306830 A1* | 12/2009 | Cummings | F15B 19/005 700/282 |
| 2011/0079201 A1* | 4/2011 | Peters | F02M 25/0818 123/520 |
| 2013/0104991 A1* | 5/2013 | Matsui | F15B 19/005 137/1 |
| 2014/0261791 A1* | 9/2014 | Grabau | F16K 37/0075 137/551 |
| 2014/0303793 A1 | 10/2014 | Anderson | |
| 2015/0362090 A1 | 12/2015 | Anderson et al. | |
| 2017/0030349 A1* | 2/2017 | Bassett | F04B 51/00 |

OTHER PUBLICATIONS

United States Patent and Trademark Office, Notice of Allowance issued in connection with U.S. Appl. No. 15/429,685, dated Oct. 30, 2017, 20 pages.

* cited by examiner

| HEALTH PARAMETER | HEALTH INFORMATION | | | ALERT THRESHOLD |
|---|---|---|---|---|
| | BASELINE PROCESS | OPERATIONAL PROCESS | ABSOLUTE VALUE DIFFERENCE | |
| SEAT LOAD ESTIMATE | 5 PSIG | 3 PSIG | 3 PSIG | 2 PSIG |
| BENCH SET ESTIMATE AT 0% VALVE POSITION | 7 PSIG | 3 PSIG | 4 PSIG | 2 PSIG |
| FRICTION ESTIMATE AT 40% VALVE POSITION | 0.67 | 0.68 | 0.01 | 0.1 |
| SPRING RATE | 0.225 | 0.225 | 0 | 0.1 |
| AVAILABLE FORCE ESTIMATE | 3 PSIG | 2 PSIG | 1 PSIG | 2 PSIG |

METHODS AND APPARATUS TO MONITOR HEALTH INFORMATION OF A VALVE

RELATED APPLICATION

This patent arises from a continuation of U.S. patent application Ser. No. 15/429,685, which was filed on Feb. 10, 2017. U.S. patent application Ser. No. 15/429,685 is hereby incorporated herein by reference in its entirety. Priority to U.S. patent application Ser. No. 15/429,685 is hereby claimed.

FIELD OF THE DISCLOSURE

This disclosure relates generally to process control systems and, more particularly, to methods and apparatus to monitor health information of a valve.

BACKGROUND

In recent years, process control systems, like those used in chemical, petroleum, and/or other processes, have grown progressively more complex with the proliferation of field devices that include more processing power than their predecessors. Current generation process control systems include a greater number and variety of field devices or instruments for measuring and/or controlling different aspects of a process control environment. In addition to utilizing field devices to monitor and/or control core processes, field devices have been increasingly used for peripheral tasks such as prognostic health monitoring.

Process control systems in which field devices fail during operation can experience increased periods of downtime. Field device failure during operation can also create hazardous operating conditions if the failed field devices provide erroneous or inaccurate data to the process control system. The consequences of failed field devices (e.g., motors, sensors, valves, etc.) that provide electronic feedback to controllers can be mitigated by performing a controlled shut down of the process equipment or by bypassing the inputs of the failed field devices to corresponding controller algorithms.

Field devices within the process control system may be located in difficult environments such as areas with extreme vibration, high pressure, and/or wide temperature ranges that may cause accelerated failure. With the implementation of increasingly powerful field devices, process control systems can monitor the prognostic health of the field devices in these difficult environments. Monitoring field devices using peripheral algorithmic routines can be used to predict potential failures and enable technicians to replace the potentially faulty field devices during periodic maintenance as opposed to halting operation of the system to replace field devices.

SUMMARY

An example system disclosed herein includes a field device in a process control network to monitor a valve, and a valve health monitor to be communicatively coupled to the field device to obtain operational health information from the field device when the valve is commanded to move from a first position to a second position, the first position opposite the second position, identify a condition of the valve based on the operational health information, and send an alert via the process control network based on the condition of the valve.

An example apparatus disclosed herein includes means for obtaining operational health information from a valve when the valve is commanded to move from a first position to a second position, the first position opposite the second position, means for calculating an operational value for a health parameter of the valve based on the operational health information, and means for calculating a difference between the operational value for the health parameter and a baseline value for the health parameter.

Another example apparatus disclosed herein includes at least one processor, and a memory in communication with the at least one processor, the memory including computer readable instructions which, when executed, cause the at least one processor to at least obtain operational health information from a valve when the valve is commanded to move from a first position to a second position, the first position opposite the second position, calculate an operational value for a health parameter of the valve based on the operational health information, and calculate a difference between the operational value for the health parameter and a baseline value for the health parameter.

BRIEF DESCRIPTION OF THE DRAWINGS

FIG. 15 is an example table depicting health information of the valve obtained during a baseline process and an operational process.

Wherever possible, the same reference numbers will be used throughout the drawing(s) and accompanying written description to refer to the same or like parts.

DETAILED DESCRIPTION

Figure 1:
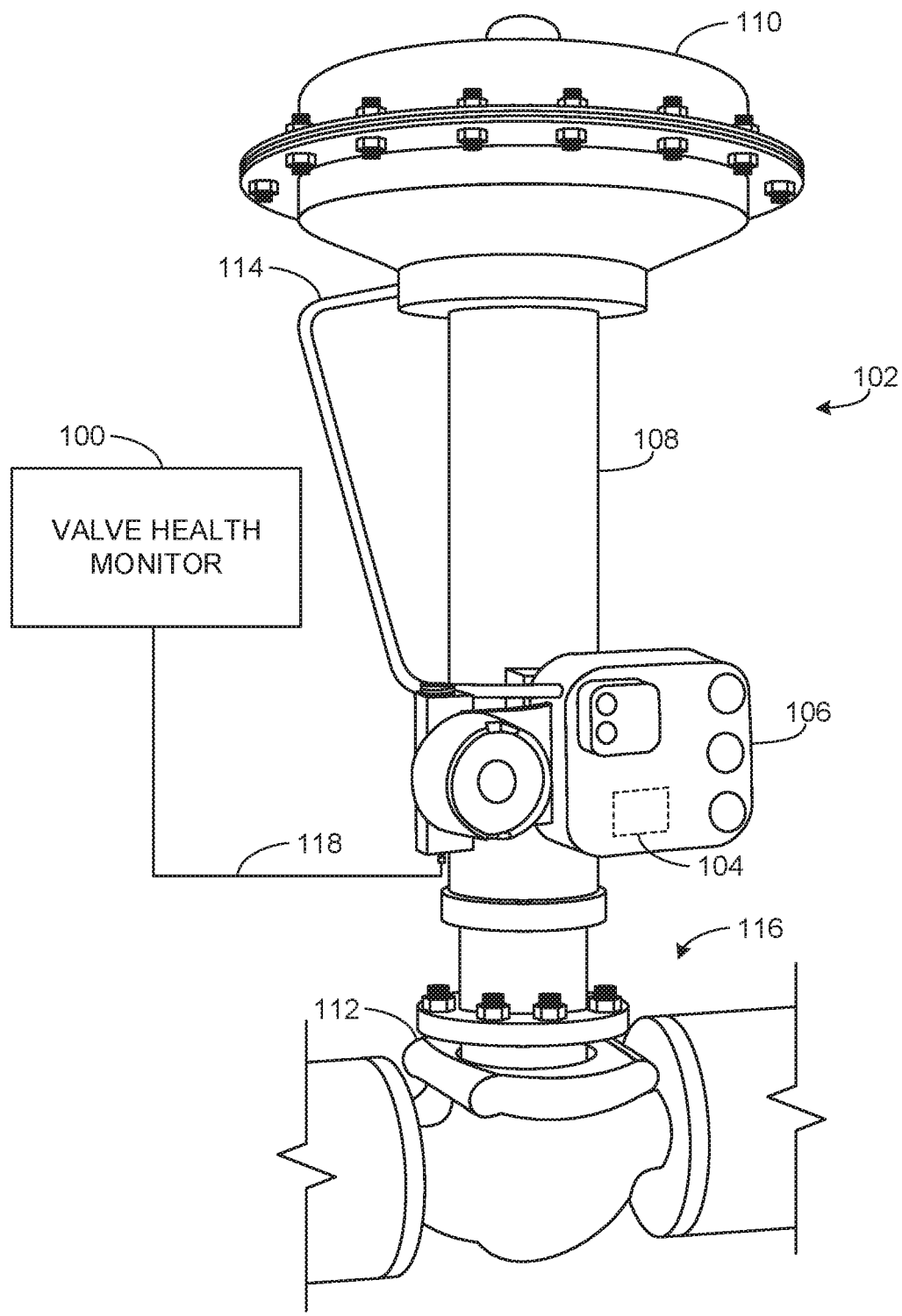
FIG. 1 is a schematic illustration of an example valve health monitor apparatus in accordance with the teachings of this disclosure.

Process control systems are growing increasingly complex as individual components with increased data acquisition resolution, processing power and signal conditioning are developed. Process control systems are used to monitor and/or to control different aspects of an operation to be conducted in a process control environment such as, for example, manufacturing components, processing raw chemical materials, etc. Process control systems typically contain at least one controller with accompanying inputs and outputs, which allow the controller(s) to acquire signals from various input field devices and/or instruments and control various output field devices and/or instruments.

As used herein, the terms "field device" or "instrument" refer to control devices such as, for example, actuators, actuator assemblies, actuator controllers, actuator positioners, sensors, transmitters, valve assemblies, etc. that may be used throughout a process control system to measure and/or control different aspects (e.g., other process control devices) of the process control system. A field device such as a valve (e.g., a valve assembly) may include both electrical and mechanical components. For example, the valve may include electrical components such as a digital valve positioner, a flow rate sensor, a pressure sensor, a valve controller, etc. In another example, the valve may include mechanical components such as an actuator (e.g., a hydraulic actuator, a pneumatic actuator, etc.), a mechanical housing, a process connection, etc.

Field device failures can result from a multitude of causes such as, for example, continuous operation, environmental factors, manufacturing defects, etc. In some examples, field devices may operate in hi-cycle applications. For example, a valve may continuously conduct a full-stroke operation that includes the valve stroking from fully open to fully closed and from fully closed to fully open. Such full-stroke valves may be designed for extended operating lifecycles. However, the timing of an inevitable failure may not be predictable and may occur during operation. Not knowing when a field device is expected to fail or about to reach a condition of impending failure poses a significant problem to the continuous operation of existing process control systems. A sudden field device failure during operation may result in the loss of the field device and equipment that the field device was monitoring and/or controlling.

Example valve health monitor (VHM) apparatus disclosed herein relate to process control systems and, more specifically, to monitoring health information of a valve. In general, the example VHM apparatus disclosed herein utilizes a controller to obtain information from sensing devices such as, for example, actuator controllers (e.g., valve controllers), position sensors (e.g., digital valve positioners, proximity sensors, etc.), process sensors (e.g., flow rate sensors, pressure sensors, etc.), etc. In some examples, the health information may include parameters that are key indicators of valve health (e.g., health parameters). For example, the health information may include parameters such as a command or an input signal (e.g., a travel set point), a valve travel or a valve position (e.g., a position of a valve), an actuator pressure, a drive signal, etc. In some instances, the health information may include parameters that may be used to calculate a parameter that is a key indicator of valve health. For example, the health information may be used to calculate a dead time (e.g., time between a command signal change and a first movement in valve position), a stroke time (e.g., time to reach full stroke, time to reach 98% of full stroke, etc.), a time constant parameter (e.g., a time to reach a percentage of full stroke), a gain value (e.g., a percentage of valve position change divided by a percentage of command signal change), etc. In some examples, the controller may be triggered to begin obtaining health information from the valve. For example, the valve may transmit a value for a trigger variable when the valve begins or ends a full-stroke operation for the valve.

In some example VHM apparatus disclosed herein, the controller may obtain baseline health information from a valve during a baseline process. For example, the valve may be a newly manufactured valve that has not yet been put into service (e.g., not yet been commissioned). The baseline process may include actuating the valve to perform a full-stroke operation. For example, the VHM apparatus may obtain health information from the valve before, after, or during one or more full-stroke valve operations. In some examples, the baseline process may be conducted in isolation from other components. For example, the VHM apparatus may obtain health information from the valve without the valve coupled to an additional component (e.g., a process pipe, a pump, etc.). In some examples, the baseline process may be conducted while the valve is coupled to one or more components. For example, the VHM apparatus may obtain health information from the valve while the valve is coupled to one or more process connections. For example, the VHM apparatus may obtain health information when the valve performs full-stroke operations while fluid moves through the process connections of the valve. In some instances, the baseline process may occur during an operation of a process control system. For example, the VHM apparatus may periodically obtain health information from the valve and store the health information as baseline health information.

In some example VHM apparatus disclosed herein, the controller may obtain operational health information from a valve during an operational process. For example, the valve may be a previously commissioned valve that operates in an active process control system. The operational process may include obtaining health information from the valve while the valve is performing full-stroke operations within a context of a routine process control operation. For example, the VHM apparatus may obtain health information from the valve while the valve is coupled to one or more process connections containing a fluid.

In some example VHM apparatus disclosed herein, the controller may process health information for a first valve based on health information obtained from a second valve. In some examples, the second valve is the same valve (e.g., the same make, the same model, the same size, the same ratings, etc.) as the first valve. For example, the first and the second valves may be both pneumatically actuated NPS 4 butterfly valves. In some instances, the second valve is similar, but not the exact same valve. For example, the second valve may be of similar make, model, type, size, rating, etc. but dissimilar in another regard (e.g., differing size, differing rating, etc.).

The second valve may be in the same process control environment as the first valve. For example, the second valve may be operatively coupled to the same process fluid system as the first valve. In another example, there may be a first group of valves (e.g., identical valves, similar valves, etc.) operatively coupled to process piping of a first process fluid system. There may also be a second group of ten valves (e.g., identical valves, similar valves, etc.) operatively coupled to process piping of a second process fluid system. The first group of valves and the second group of valves may be identical to each other, similar to each other, etc. The controller may compare health information from one or more valves of the first group to one or more valves of the second group to identify a condition of the one or more valves of the first group, the second group, etc.

Alternatively, the second valve may not be in the same fluid process system as the first valve. For example, the first valve may be operatively coupled to an outdoor fluid process environment while the second valve may be operatively coupled to an indoor manufacturing process control environment. The health information of the second valve may be communicated to the first valve via a network. Additionally or alternatively, the health information of the second valve may be stored as reference data in a database within a controller of the first valve.

In some examples, the second valve is not a physical valve. For example, the second valve may be based on a model of a valve (e.g., an ideal operating valve). The model of the valve may include health information at varying life stages of the valve (e.g., an ideal dead time parameter at 0 cycles, 100 cycles, 1000 cycles, etc.), at varying operating conditions (e.g., an ideal dead time parameter where an ambient temperature of the ideal valve is 20 degrees Celsius, an ideal dead time parameter where a process fluid of the ideal valve is 40 degrees Celsius, etc.), etc. The health information of the first valve may be compared to the health information of the second valve to identify a condition of the first valve.

In some example VHM apparatus disclosed herein, the controller may process the obtained health information. In some examples, the VHM apparatus may compare processed operational health information to baseline health information to determine a difference. For example, the VHM apparatus may determine a first health parameter for a valve during an operational process. The VHM apparatus may compare the first health parameter to a second health parameter for the valve, where the second health parameter was obtained during a baseline process. The VHM apparatus may determine a difference between the first health parameter and the second health parameter.

The VHM apparatus may determine if the difference satisfies a threshold (e.g., the difference is greater than 100 milliseconds, the difference is greater than 5%, etc.). The VHM apparatus may generate a threshold (e.g., adjust an existing threshold, create a new threshold, etc.) based on current health information and/or past health information for the valve. Alternatively, the VHM apparatus may generate the threshold based on current health information and/or past health information obtained from a second valve (e.g., a second valve located in the same process control environment as the valve, a second valve located in a process control environment separate from the valve, etc.). The VHM apparatus may identify a condition of the structure based on the difference. For example, the VHM apparatus may identify a failure mode or a potential failure mode for the valve based on the difference. For example, the VHM apparatus may determine that there is a mechanical obstruction in the valve actuator based on the difference between a first dead time health parameter and a second dead time health parameter, where the difference satisfies a threshold. In some examples, the VHM apparatus generates an alert based on the difference satisfying the threshold. For example, the VHM apparatus may generate an alert based on an identified failure mode, where the identified failure mode is based on the difference satisfying the threshold.

Turning to FIG. 1, an example valve health monitor (VHM) apparatus 100 disclosed herein operates in a process control environment 102 by obtaining health information from a field device 104 (e.g., an electronic valve controller) for a valve assembly 108. In the illustrated example, the field device 104 is an electronic valve controller housed in an enclosure 106 and coupled to the example pneumatically actuated valve assembly 108 and which includes at least an actuator 110 and a valve 112 (e.g., a butterfly valve, a gate valve, etc.). However, other valve assemblies may additionally or alternatively be utilized, such as an electrically actuated valve assembly, a hydraulically actuated valve assembly, etc. The field device 104 measures one or more parameters of the actuator 110 and/or the valve 112 (e.g., the position of the valve 112) and/or controls the actuator 110 and/or the valve 112. The field device 104 may measure a parameter such as, for example, a valve travel (e.g., a position of a valve), an actuator pressure, a drive signal, etc. The field device 104 may control the actuator 110 and/or the valve 112 via a parameter such as, for example, a command or an input signal (e.g., a travel set point). The enclosure 106 for the field device 104 includes a connection point for a pneumatic tube connection 114. The field device 104 may enable pneumatic control of the actuator 110 via the pneumatic tube connection 114.

In the illustrated example, the valve assembly 108 is installed in a fluid process system 116 (e.g., a distribution piping system) of a plant environment or processing system. The fluid process system 116 may be located in an environment that may expose the field device 104 and/or the valve assembly 108 to one or more difficult operating conditions (e.g., extreme vibration, a wide temperature range, etc.) and cause premature failure of the field device 104 and/or the valve assembly 108 due to accelerated wear. For example, the field device 104 and the valve assembly 108 may be installed downstream of a positive-displacement pump and subjected to extreme vibration. Different failure modes of the field device 104 and/or the valve assembly 108 may occur due to the accelerated wear such as, for example, the actuator 110 having a broken spring, the pneumatic tube connection 114 decoupling and providing insufficient air to the actuator 110, a mechanical obstruction of the valve 112, etc.

In the illustrated example, the field device 104 is coupled to the example VHM apparatus 100. Although the field device 104 is depicted in FIG. 1 as coupled via a cable 118 that includes one or more wires, the field device 104 may additionally or alternatively be connected via a wireless network. The example VHM apparatus 100 may be a process control system or a part of a process control system (e.g., communicatively coupled to a process control system) that includes a controller for data acquisition and/or processing. The example VHM apparatus 100 obtains health information from the field device 104 during operation (e.g., an operational process) to identify a difference between operational health information and previously obtained baseline health information. The difference in the health information obtained from the field device 104 may be related to a condition of the valve assembly 108. For example, the condition of the valve assembly 108 may be a degradation or deterioration of structural aspects and/or operating performance of the valve assembly 108 such as, for example, a decoupling of a component attached to the valve assembly 108, a decoupling of a component attached within the valve assembly 108, a corroded component failing in the actuator 110, a break in a pneumatic seal of the pneumatic tube connection 114, etc. Determining if the difference between the operational health information and the baseline health information increases over time may indicate a degradation or deterioration of the condition (e.g., the health) of the valve assembly 108.

Figure 2:
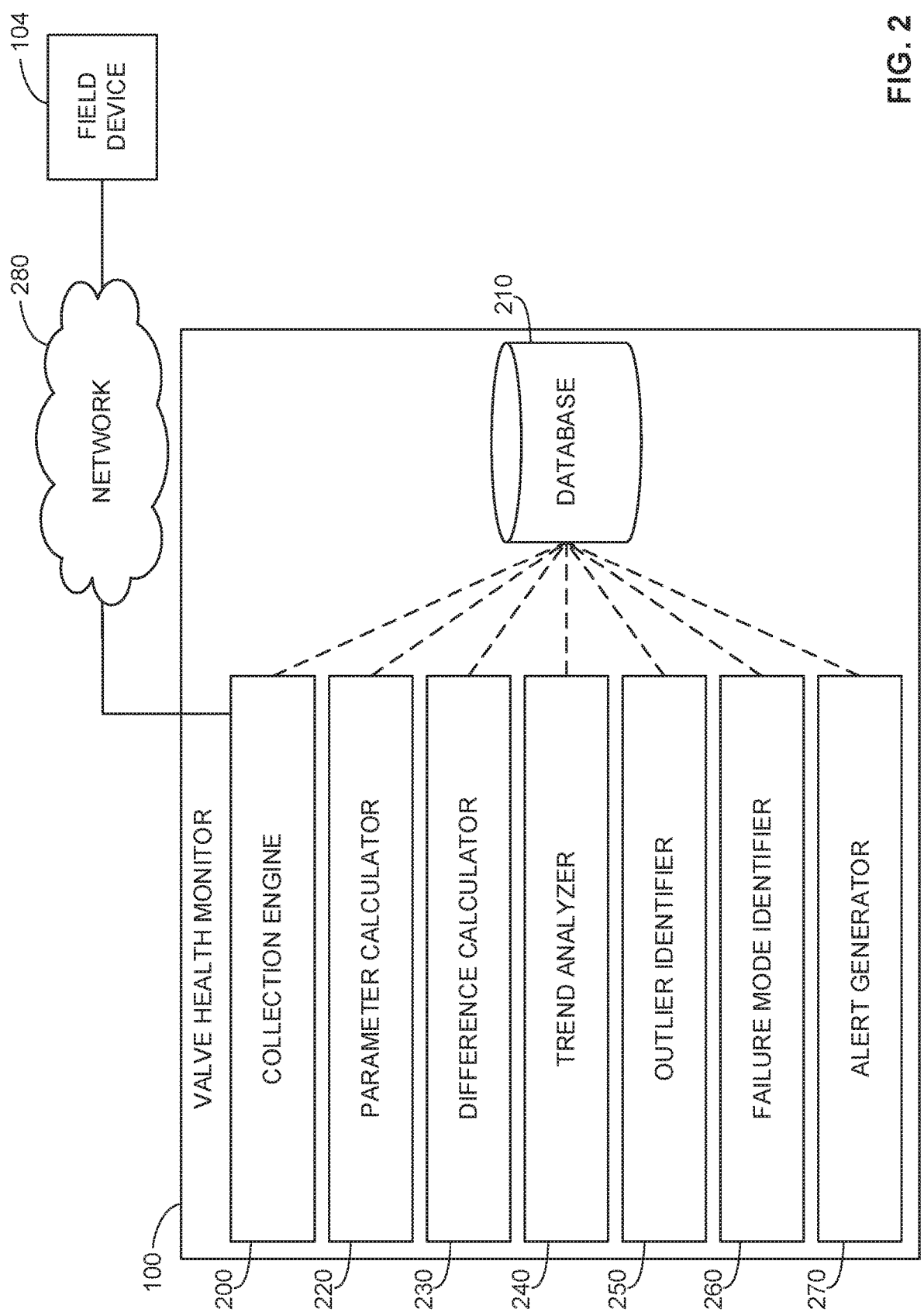
FIG. 2 is a block diagram of an example implementation of the example valve health monitor of FIG. 1.

FIG. 2 is a block diagram of an example implementation of the VHM apparatus 100 of FIG. 1. The example VHM apparatus 100 determines if the difference between operational health information of a valve and baseline health information of the valve identifies a condition of the valve. For example, the VHM apparatus 100 may determine if the difference between the operational health information obtained from the field device 104 and the baseline health information obtained from the field device 104 identifies a condition of the valve assembly 108. The example VHM apparatus 100 includes an example collection engine 200, an example database 210, an example parameter calculator 220, an example difference calculator 230, an example trend analyzer 240, an example outlier identifier 250, an example failure mode identifier 260, and an example alert generator 270. The example VHM apparatus 100 is communicatively coupled to the example field device 104 via an example network 280.

In the illustrated example of FIG. 2, the VHM apparatus 100 includes the collection engine 200 to obtain, select, and process health information from a valve. For example, the collection engine 200 may obtain, select, and process the health information from the field device 104 via the network 280. In another example, the collection engine 200 may obtain, select, and process the health information from the database 210. In yet another example, the collection engine 200 may obtain, select, and process the health information from the field device 104 via a direct wired or wireless connection. In some examples, the collection engine 200 obtains the health information from one or more valves during a time period in which baseline health information is obtained (e.g., during a post-manufacturing quality inspection, during a pre-operating commissioning procedure, etc.). In some instances, the collection engine 200 generates and/or transmits a command (e.g., a control command) to the one or more valves during a baseline process. For example, the collection engine 200 may generate and/or transmit an open valve command, a close valve command, etc. to a process control system communicatively coupled to the valve assembly 108 of FIG. 1 or to the field device 104 via the network 280. In some instances, the collection engine 200 stores the generated and/or transmitted command in the database 210. In some examples, the collection engine 200 retrieves the command from the database 210. Additionally or alternatively, the collection engine 200 may obtain a command generated by the field device 104.

In some examples, the collection engine 200 obtains health information from one or more valves during a time period in which operational health information is obtained (e.g., during an operational valve process, during an operational process control system process, etc.). In some examples, the collection engine 200 obtains processed health information, where the processed health information includes processed parameters (e.g., scaled parameters, translated parameters, etc.). In some instances, the collection engine 200 obtains unprocessed health information, where the unprocessed health information includes unprocessed parameters (e.g., unscaled parameters, untranslated parameters, etc.).

In some examples, the collection engine 200 obtains the health information via a communication protocol from the valve assembly 108. For example, the collection engine 200 may obtain the health information from the field device 104 via one or more communication protocols such as, for example, bus protocols (controller area network (CAN) bus, Modbus™, Profibus™, etc.), Ethernet protocols (e.g., EtherCAT™, Profinet™, etc.), serial protocols (e.g., RS-232, RS-485, etc.), etc. In some examples, the collection engine 200 obtains the health information based on an electronic trigger or data acquisition trigger information obtained from the valve assembly 108. For example, the collection engine 200 may obtain the data acquisition trigger information that includes a value for a trigger variable from the field device 104 for the valve assembly 108. The collection engine 200 determines whether the data acquisition trigger information includes a start data acquisition command. For example, the collection engine 200 may determine that the obtained value for the trigger variable includes a start data acquisition command, an end data acquisition command, etc. In some examples, the collection engine 200 obtains the value for the trigger variable when the valve assembly 108 begins or ends a full-stroke valve operation. For example, the collection engine 200 may be directed to begin data acquisition when the field device 104 transmits the value for the trigger variable in response to the valve assembly 108 beginning a full-stroke valve operation.

In the illustrated example of FIG. 2, the collection engine 200 selects obtained health information of interest to be used by one or more algorithms, processes, programs, etc. In some examples, the collection engine 200 selects one or more subsets of obtained health information of interest to process. The collection engine 200 may select one or more subsets of obtained health information during a time period. For example, the collection engine 200 may select obtained health information for a specified minute, hour, day, etc. In another example, the collection engine 200 may select obtained health information when a specific action has occurred (e.g., the valve assembly 108 has operated for more than 100 hours, the valve position is 0% open, etc.). In some instances, the collection engine 200 selects one or more parameters of interest from a plurality of parameters to process. For example, the collection engine 200 may select one parameter of interest to process from a set or list of ten parameters.

In the illustrated example of FIG. 2, the collection engine 200 processes the health information by sorting the health information into one or more health parameters. For example, the health information may include a string of data separated by one or more data delimiters (e.g., a hash mark "#", a space, a comma, etc.). The health information located between data delimiters may represent a timestamp and/or a value for the health parameter. The timestamp may indicate a time at which the field device 104 records and/or processes the health information, a time at which the VHM apparatus 100 obtains the health information, etc. In some examples, the timestamp includes a date and time. However, any other timestamp format may additionally or alternatively be used. For example, the timestamp may include a time zone identifier, the time may be formatted using a twelve-hour representation, a twenty-four-hour representation, a Unix time representation, etc.

In some examples, health information located between data delimiters may represent a description for a health parameter. For example, the description may include a name of the health parameter (e.g., actuator pressure, drive signal, etc.), a unit of measure of the health parameter (e.g., pounds per square inch gauge, milliamps, etc.), etc. In some examples, the collection engine 200 processes the health parameter by determining if the health parameter is a calculated parameter based on whether the health parameter requires further calculations. For example, the health parameters such as, for example, a dead time health parameter, a stroke time health parameter, a time constant health parameter (e.g., a t63 time constant health parameter), a gain value health parameter, etc. are calculated parameters. For example, the collection engine 200 may determine that the dead time health parameter is a calculated health parameter because the dead time health parameter requires additional calculations for the VHM apparatus 100 to utilize the dead time health parameter. In some instances, the collection engine 200 modifies a value of a flag (e.g., a flag in computer and/or machine readable instructions) when the collection engine 200 determines that the health parameter is a calculated parameter.

In the illustrated example of FIG. 2, the VHM apparatus 100 includes the database 210 to record data (e.g., baseline health information, operational health information, baseline values for health parameters, operational values for health parameters, etc.). In some examples, the database 210 records a flag (e.g., a calculate parameter flag) and/or a variable associated with the obtained data. For example, the VHM apparatus 100 may set the calculate parameter flag for the dead time health parameter and store the calculate parameter flag in the database 210. The example database 210 may respond to queries for information related to data in the database 210. For example, the database 210 may respond to queries for additional data by providing the additional data (e.g., the one or more data points), by providing an index associated with the additional data in the database 210, etc. The example database 210 may additionally or alternatively respond to queries when there is no additional data in the database 210 by providing a null index, an end of database 210 identifier, etc. The example database 210 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 210 may additionally or alternatively be implemented by one or more double data rate (DDR) memories, such as DDR, DDR2, DDR3, mobile DDR (mDDR), etc. The example database 210 may additionally or alternatively be implemented by one or more mass storage devices such as hard disk drive(s), compact disk drive(s) digital versatile disk drive(s), etc. While in the illustrated example the database 210 is illustrated as a single database, the database 210 may be implemented by any number and/or type(s) of databases.

In the illustrated example of FIG. 2, the VHM apparatus 100 includes the parameter calculator 220 to convert (e.g., convert using a conversion calculation, converting to different units of measure, etc.), scale (e.g., scale using a scaling factor), translate (e.g., translate using a translation curve) and/or otherwise process a health parameter obtained from health information into a format that may be used by the example VHM apparatus 100. In some examples, the parameter calculator 220 performs a calculation based on an unprocessed health parameter, where the unprocessed health parameter includes analog electrical signal information (e.g., a voltage amplitude, a current measurement, etc.), digital electrical signal information (e.g., a hex value based on a communication protocol data packet), etc. For example, the parameter calculator 220 may calculate a valve position parameter based on unprocessed valve position information. The unprocessed valve position information may include a voltage amplitude. The parameter calculator 220 may convert the voltage amplitude to a measure of the valve position (e.g., the valve 112 is 25% open, etc.). In some examples, the parameter calculator 220 stores the calculation based on the unprocessed health parameter in the database 210. In some instances, the parameter calculator 220 retrieves information from the database 210 for processing. For example, the parameter calculator 220 may retrieve unprocessed health information including unprocessed health parameters from the database 210 for processing.

In some examples, the parameter calculator 220 performs a calculation based on a processed health parameter. For example, the parameter calculator 220 may calculate an actuator pressure based on processed actuator pressure health information. The processed actuator pressure health information may include a first value with a first unit of measure (e.g., pounds per square inch gauge (PSIG)). The parameter calculator 220 may convert the first value with the first unit of measure (e.g., PSIG) to a second value with a second unit of measure (e.g., bar), where the second value is based on the conversion from the first unit of measure to the second unit of measure.

In some examples, the parameter calculator 220 calculates a difference when calculating a health parameter (e.g., an unprocessed health parameter, a processed health parameter, etc.). For example, the parameter calculator 220 may calculate a difference in timestamps when calculating the health parameter. For example, the parameter calculator 220 may calculate the difference between a first timestamp and a second timestamp when calculating a dead time health parameter. In some instances, the parameter calculator 220 determines whether the difference satisfies a threshold when calculating the health parameter. For example, the parameter calculator 220 may determine whether the difference between a first valve command value and a second valve command value satisfies a valve command threshold value (e.g., the difference is greater than 0.5 milliamps). In another example, the parameter calculator 220 may determine whether the difference between a first valve position and a second valve position satisfies a valve position threshold (e.g., the difference is greater than 1%). In some examples, the parameter calculator 220 stores the calculation based on the processed health parameter in the database 210. In some instances, the parameter calculator 220 retrieves the processed health parameter from the database 210 for processing.

In the illustrated example of FIG. 2, the VHM apparatus 100 includes the difference calculator 230 to calculate a difference between health parameters of a valve. In some examples, the difference calculator 230 calculates a difference between an operational value and a baseline value for a health parameter. For example, the difference calculator 230 may calculate the difference between an operational value for a dead time health parameter and a baseline value for the dead time health parameter. In some examples, the difference calculator 230 retrieves the operational value and the baseline value for the health parameter from the database 210. The difference calculator 230 may determine whether the difference satisfies a threshold. For example, the difference calculator 230 may determine whether the difference between the operational value for the dead time health parameter and the baseline value for the dead time health parameter satisfies the threshold (e.g., the difference is greater than 100 milliseconds).

In some instances, the difference calculator 230 calculates a difference between two operational values for a health parameter. For example, the difference calculator 230 may calculate a difference between a first operational value for the dead time health parameter and a second operational value for the dead time health parameter. In some examples, the difference calculator 230 retrieves the first and second operational values for the health parameter from the database 210. The difference calculator 230 may determine whether the difference satisfies a threshold. For example, the difference calculator 230 may determine whether the difference between the first operational value for the dead time health parameter and the second operational value for the dead time health parameter satisfies the threshold (e.g., the difference is greater than 100 milliseconds).

In some examples, the difference calculator 230 calculates a difference between two baseline values for a health parameter. For example, the difference calculator 230 may calculate the difference between a first baseline value for the dead time health parameter and a second baseline value for the dead time health parameter. In some examples, the difference calculator 230 retrieves the first and second baseline values for the health parameter from the database 210. The difference calculator 230 may determine whether the difference satisfies a threshold. For example, the difference calculator 230 may determine whether the difference between the first baseline value for the dead time health parameter and the second baseline value for the dead time health parameter satisfies the threshold (e.g., the difference is greater than 100 milliseconds). In response to determining whether the difference satisfies the threshold, the difference calculator 230 may store a baseline value for a health parameter value in the database 210. For example, the difference calculator 230 may store the second baseline value for the dead time health parameter in the database 210 when the difference between the first baseline value for the dead time health parameter and the second baseline value for the dead time health parameter satisfies the threshold (e.g., the difference is greater than 100 milliseconds).

In some instances, the difference calculator 230 calculates a difference between two values. For example, the difference calculator 230 may calculate the difference between a first timestamp and a second timestamp. In another example, the difference calculator 230 may calculate the difference between a value and a mean (e.g., an average value). For example, the difference calculator 230 may calculate the difference between an operational value for the dead time health parameter and a mean baseline value for the dead time health parameter. In some examples, the difference calculator 230 retrieves the two values from the database 210. In some instances, the difference calculator 230 may determine whether the difference satisfies a threshold. For example, the difference calculator 230 may calculate the difference between the operational value for the dead time health parameter and the mean value for the dead time health parameter and determine whether the difference satisfies a threshold (e.g., the difference is greater than one standard deviation value).

In the illustrated example of FIG. 2, the VHM apparatus 100 includes the trend analyzer 240 to select, compare, and analyze trends of one or more health parameters of a valve. In some examples, the trend analyzer 240 selects a health parameter of interest and analyzes values for the selected health parameter during a time period. For example, the trend analyzer 240 may select an overall response time for the valve assembly 108. The trend analyzer 240 may select corresponding data for the overall response time for the valve assembly 108. For example, the trend analyzer 240 may retrieve the corresponding data from the database 210. The trend analyzer 240 may determine a trend that indicates that the overall response time for the valve assembly 108 has increased for the time period. In some examples, the trend analyzer 240 determines the trend based on operational values during the time period. In some instances, the trend analyzer 240 determines the trend based on a trend value. For example, the trend value may be a first value in a first-in first-out (FIFO) buffer queue that was obtained and/or processed by the collection engine 200. In another example, the trend value for the health parameter may be the baseline value for the health parameter. In another example, the trend value may be a moving-window average of a set of values (e.g., baseline values, operational values, etc.), where the moving-window average is calculated using a plurality of values. For example, the trend analyzer 240 may compare an operational value for the dead time health parameter to the trend value for the dead time health parameter, where the trend value is an average of the previous ten obtained and/or processed operational values for the dead time health parameter. In some examples, the trend analyzer 240 stores the trend value in the database 210. In some instances, the trend analyzer 240 retrieves the trend value from the database 210.

In some instances, the trend analyzer 240 performs analysis based on dynamics of a valve of interest. The valve may behave differently from cycle to cycle. For example, the valve may have varying health parameters based on a density, pressure, temperature, etc. of a process fluid passing through the valve. The valve may also have varying health parameters based on the mechanics of the valve such as, for example, irregularities in air supplied via the pneumatic tube 114 of FIG. 1, varying friction in the valve 112, etc. In some examples, due to the dynamics (e.g., varying dynamics) of the valve, calculations performed by the trend analyzer 240 and/or more generally the VHM apparatus 100 of FIGS. 1 and/or 2 are used as approximations and/or comparison factors to identify a condition of a valve such as for example, the valve assembly 108 of FIG. 1.

In some examples, the trend analyzer 240 selects, compares, and analyzes one or more health parameters as a function of an additional health parameter based on operational data for the health parameters. For example, the trend analyzer 240 may select a first health parameter and a second health parameter, where the second health parameter is a function of the first health parameter. For example, the trend analyzer 240 may select a valve position health parameter and an actuator pressure health parameter for a valve. The trend analyzer 240 may select corresponding operational data for the valve position health parameter and the actuator pressure health parameter for the valve assembly 108 during one or more time periods. The trend analyzer 240 may select a first operational value for the actuator pressure health parameter (e.g., 15 PSIG) at a first value for the valve position health parameter (e.g., 40% open) during a first operational time period. The trend analyzer 240 may select a second operational value for the actuator pressure health parameter (e.g., 8 PSIG) at the first value for the valve position health parameter (e.g., 40% open) during a second operational time period. The trend analyzer 240 may compare the first and second values for the actuator pressure health parameter and determine if the difference satisfies a threshold (e.g., the difference is greater than 5 PSIG).

In some instances, the trend analyzer 240 selects, compares, and analyzes one or more health parameters as a function of an additional health parameter based on baseline values and operational values. For example, the trend analyzer 240 may select a first health parameter and a second health parameter, where the second valve health parameter is a function of the first health parameter. For example, the trend analyzer 240 may select a valve position health parameter and an actuator pressure health parameter for a valve. The trend analyzer 240 may select corresponding operational data and baseline data for the valve position health parameter and the actuator pressure health parameter for the valve assembly 108 during one or more time periods. The trend analyzer 240 may select an operational value for the actuator pressure health parameter (e.g., 15 PSIG) at an operational value for the valve position health parameter (e.g., 40% open) during an operational time period. The trend analyzer 240 may select a baseline value for the actuator pressure health parameter (e.g., 22 PSIG) at the operational value for the valve position health parameter (e.g., 40% open) during a baseline period. The trend analyzer 240 may compare the first and second values for the actuator pressure health parameter and determine if the difference satisfies a threshold (e.g., the difference greater than 5 PSI).

In some examples, the trend analyzer 240 performs regression analysis on a relationship between two or more health parameters. For example, the trend analyzer 240 may select a first health parameter and a second health parameter, where the second health parameter is a function of the first health parameter. For example, the trend analyzer 240 may select a valve position health parameter and an actuator pressure health parameter for a valve. The trend analyzer 240 may select corresponding operational data and baseline data for the valve position health parameter and the actuator pressure health parameter for the valve assembly 108 during a time period. The trend analyzer 240 may determine a range of values for the second health parameter as a function of the first health parameter. For example, the trend analyzer 240 may plot the actuator pressure health parameter as a function of the valve position health parameter.

In some examples, the trend analyzer 240 determines a slope, a y-intercept, and/or a boundary value for a relationship between two or more health parameters. For example, the trend analyzer 240 may determine the slope for a line, where the line includes values for the actuator pressure health parameter as the function of the valve position health parameter. The trend analyzer 240 may determine the slope for the line to be a spring rate of the valve assembly 108. For example, the spring rate of the valve assembly 108 may be the force necessary to compress the spring of the valve assembly 108 by a specified distance. The trend analyzer 240 may determine the y-intercept for the line to be a seat load estimate of the valve assembly 108. For example, the seat load estimate may be an estimate of a pressure force from the spring of the valve assembly 108 remaining when all actuator pressure is removed. The trend analyzer 240 may calculate a health parameter based on the boundary value (e.g., the value where the valve 112 is 0% closed or 100% closed) of the line. For example, the trend analyzer 240 may determine the available force estimate health parameter by determining the actuator pressure at the closed valve position (e.g., the valve 112 is 100% closed). For example, the available force estimate may be an estimate amount of available force to open the valve 112 from the closed valve position.

In some instances, the trend analyzer 240 determines a value of a parameter by analyzing a relationship between two or more health parameters. For example, the trend analyzer 240 may determine an actuator pressure health parameter as a function of a valve position health parameter. The trend analyzer 240 may determine a theoretical estimate (e.g., a bench set estimate) of the actuator pressure health parameter as the function of the valve position health parameter. For example, the trend analyzer 240 may determine an average value for the actuator pressure health parameter when the valve 112 travels from fully closed to fully opened and/or from fully opened to fully closed. For example, the trend analyzer 240 may determine a first value for the actuator pressure health parameter (e.g., 20 PSIG) at a first value for the valve position health parameter (e.g., 60% open) when the valve 112 travels from open to closed. The trend analyzer 240 may determine a second value for the actuator pressure health parameter (e.g., 16 PSIG) at the first value for the valve position health parameter (e.g., 60% open) when the valve 112 travels from closed to open. The trend analyzer 240 may use the first value (e.g., 20 PSIG) and the second value (e.g., 16 PSIG) to determine the average value for the actuator pressure health parameter (e.g., ((20 PSIG+16 PSIG)÷2)=18 PSIG) at the first value for the valve position health parameter (e.g., 60% open). The trend analyzer 240 may perform similar calculations to determine a plurality of average values for the range of the valve position health parameter (e.g., 0% open to 100% open). In some examples, the trend analyzer 240 stores the calculated information (e.g., the average values for the actuator pressure health parameter) in the database 210. In some instances, the trend analyzer 240 may produce a graph or a plot based on the calculated information. For example, the trend analyzer 240 may produce the plot depicting the average values for the actuator pressure health parameter as the function of the valve position health parameter.

In some examples, the trend analyzer 240 calculates a difference between the values for the actuator pressure health parameter when the valve 112 travels from fully closed to fully opened and from fully opened to fully closed. For example, the trend analyzer 240 may determine a first value for the actuator pressure health parameter (e.g., 20 PSIG) at a valve position (e.g., 40% open) when the valve 112 travels from fully closed to fully opened. The trend analyzer 240 may determine a second value for the actuator pressure health parameter (e.g., 12 PSIG) at the valve position (e.g., 40% open) when the valve 112 travels from fully opened to fully closed. The trend analyzer 240 may determine that the difference between the first value and the second value (e.g., (20 PSIG−12 PSIG)=8 PSIG) is a value for a two-times friction estimate of the valve assembly 108, or the value that is double a friction estimate for the valve assembly 108. By halving the two-times friction estimate value (e.g., (8 PSIG÷2)=4 PSIG), the trend analyzer 240 may determine the friction estimate value for the valve assembly 108 (e.g., 4 PSIG). In some examples, the trend analyzer 240 may analyze the friction estimate value for the valve assembly 108 during a time period. For example, the trend analyzer 240 may determine the friction estimate value for the valve assembly 108 for every full stroke of the valve 112 and compare the friction estimate values for the life of the valve 112.

In some instances, the trend analyzer 240 determines a trend status. A trend status may be a status indicator of valve health. For example, the trend status may be a percentage of available health of a valve (e.g., a valve is 100% healthy, a valve is 50% healthy, etc.). The trend status may include a deteriorating status, a failing status, a warning status, etc. In some examples, the trend analyzer 240 determines the trend status based on whether operational values for a health parameter are approaching a threshold. For example, the trend analyzer 240 may determine that values for a dead time health parameter are approaching a threshold (e.g., a value for a dead time health parameter is greater than 500 milliseconds). The trend analyzer 240 may update the trend status to include a warning status based on the trend analyzer 240 determining that the values for the dead time health parameter are approaching a threshold. In some examples, the trend analyzer 240 updates the trend status based on a rate of change for the values. For example, the trend analyzer 240 may determine that the values for the dead time health parameter are approaching the threshold at a first rate (e.g., the values for the dead time health parameter are increasing by 5 milliseconds every full stroke cycle), where the first rate indicates imminent failure. The trend analyzer 240 may update the trend status to including a failing status when the trend analyzer 240 determines the values for the dead time health parameter are increasing at the first rate.

In some examples, the trend analyzer 240 determines the trend status based on whether a difference between two operational values for a health parameter is approaching a threshold. For example, the trend analyzer 240 may determine that a difference between a first operational value for a dead time health parameter and a second operational value for a dead time health parameter is approaching a threshold (e.g., a difference is greater than 100 milliseconds). The trend analyzer 240 may update the trend status to include a deteriorating status, indicating that a condition of the valve assembly 108 associated with the difference is deteriorating (e.g., the structure of the valve assembly 108 may deteriorate to failure).

In some examples, the trend analyzer 240 determines the trend status based on whether a difference between an operational value and a baseline value for a health parameter is approaching a threshold. For example, the trend analyzer 240 may determine that a difference between an operational value for a dead time health parameter and a baseline value for a dead time health parameter is approaching a threshold (e.g., a difference is greater than 100 milliseconds). The trend analyzer 240 may update the trend status to include a failing status, indicating that a condition of the valve assembly 108 associated with the difference is failing (e.g., the valve assembly 108 may experience imminent failure). In some examples, the trend analyzer 240 determines an estimate timeline for a valve failure. For example, the trend analyzer 240 may determine an estimate amount of time until the valve assembly 108 experiences a failure based on the trend status. In some examples, the trend analyzer 240 stores the trend status in the database 210. In some instances, the trend analyzer 240 retrieves the trend status from the database 210.

Additionally or alternatively, the trend analyzer 240 may select, compare, and analyze trends of one or more health parameters of a first valve with respect to health information obtained from a second valve (e.g., a valve that is the same as the first valve, an ideal valve, etc.). For example, the trend analyzer 240 for the first valve may compare one or more health parameters of the first valve to the one or more health parameters of the second valve. The trend analyzer 240 for the first valve may select, compare, and analyze one or more health parameters as a function of an additional health parameter (e.g., based on baseline and/or operational values of the first valve) with respect to health information obtained from the second valve (e.g., based on baseline and/or operational values of the second valve). In some examples, the trend analyzer 240 compares regression analysis on a relationship between two or more health parameters of the first valve to regression analysis on a relationship between two or more health parameters of the second valve. The trend analyzer 240 may obtain the information from the second valve from the database 210 and/or via the second valve via the network 280. The trend analyzer 240 may update information (e.g., a trend status, a threshold, etc.) related to the health information of the first valve based on health information corresponding to the second valve.

In the illustrated example of FIG. 2, the VHM apparatus 100 includes the outlier identifier 250 to determine whether a value (e.g., a data point) for a calculated health parameter or a value (e.g., a data point) for an obtained health parameter is an outlier. In some examples, the outlier identifier 250 calculates at least a mean value and a standard deviation value for a health parameter of interest. The outlier identifier 250 may determine a difference between the mean value and the value for the health parameter during a time period. The outlier identifier 250 may determine that the value for the health parameter is an outlier when the difference satisfies a threshold (e.g., the difference exceeds one or more standard deviation values). In some instances, the outlier identifier 250 removes the identified outlier value from the baseline health information or the operational health information for the health parameter. In some examples, the outlier identifier 250 stores the outlier in the database 210. In some instances, the outlier identifier 250 retrieves the data point, the mean value, the standard deviation value, etc. from the database 210.

In the illustrated example of FIG. 2, the VHM apparatus 100 includes a failure mode identifier 260 to identify a potential failure or to diagnose an existing failure of the valve assembly 108. In some examples, the failure mode identifier 260 determines whether a change in a health parameter during a time period can be attributed or credited to a mechanical degradation or a structural condition of the valve assembly 108. For example, the failure mode identifier 260 may determine that a decrease in a t63 time health parameter (e.g., an amount of time a valve takes to travel to 63% of full stroke distance) or a stroke time health parameter (e.g., an amount of time a valve takes to travel to 98% of full stroke distance, an amount of time a valve take to travel to 100% of full stroke distance, etc.) can be credited to an actuator spring failure of the valve assembly 108. In some examples, a broken actuator spring at one end of valve travel behaves like a stiffer actuator spring. For example, when the valve 112 travels towards to the broken end (i.e., towards the broken actuator spring), values for the t63 time health parameter and/or the stroke time health parameter may increase due to the broken actuator spring providing a greater than normal level of resistance to movement of the valve 112. When the valve 112 travels away from the broken end, the values for the t63 time health parameter and/or the stroke time health parameter may decrease as the broken actuator spring assists movement of the valve 112. In some examples, the failure mode identifier 260 stores the identified failure mode in the database 210. In some instances, the failure mode identifier 260 retrieves the health information (e.g., the baseline health information, the operational health information, etc.) from the database 210.

In the illustrated example of FIG. 2, the VHM apparatus 100 includes the alert generator 270 to generate an alert based on a change in one or more health parameters. In some examples, the alert generator 270 generates the alert when a difference between a first operational value and a second operational value for a health parameter satisfies a threshold. In some instances, the alert generator 270 generates the alert when a difference between an operational value and a baseline value for the health parameter satisfies a threshold. In some examples, the alert generator 270 employs a pre-defined threshold that may be dependent on a default threshold value or user input. In some examples, the alert generator 270 utilizes a calculated threshold. For example, the alert generator 270 may base the calculated threshold on one or more standard deviation values. In some examples, the alert generator 270 stores the threshold and/or the generated alert in the database 210. In some instances, the alert generator 270 retrieves the threshold and/or the generated alert from the database 210.

In some examples, when the alert generator 270 determines that the difference between the first and second operational values for the health parameter satisfies the threshold, then the alert generator 270 may identify the condition of the valve assembly 108. For example, the alert generator 270 may identify the condition of the valve assembly 108 to be a degradation of the structure (e.g., a crack in a valve seal, a crack in an air supply connection seal, etc.), a deterioration in the performance of the structure (e.g., a loss of air pressure, a mechanical obstruction, etc.), a failing of the structure (e.g., the actuator 110 cannot move, the valve 112 can no longer hold pressure etc.), etc. In response to identifying the condition of the structure, the example alert generator 270 may generate an alert such as, for example, sounding an alarm, propagating an alert message throughout a process control network, generating a failure log and/or a report, displaying the alert on a display, etc.

In some examples, the alert generator 270 generates a threshold (e.g., adjust an existing threshold, create a new threshold, etc.) based on current health information and/or past health information for the valve assembly 108. For example, the alert generator 270 may modify an existing threshold (e.g., a default threshold) for a dead time health parameter for the valve assembly 108 based on the most recently calculated dead time health parameter for the valve assembly 108. Alternatively, the alert generator 270 may generate the threshold based on current health information and/or past health information obtained from a second valve. The second valve may be operatively coupled to the fluid process system 116 via process piping. The second valve may be operatively coupled to a second fluid process system separate from the fluid process system 116, etc. For example, the alert generator 270 may modify the dead time health parameter for the valve assembly 108 based on an obtained dead time health parameter for a similar valve in a fluid process system external to the fluid process system 116.

In the illustrated example of FIG. 2, the network 280 is a bus and/or a computer network. For example, the network 280 may be an internal controller bus, a process control network, a direct wired connection to an interface of the field device 104, etc. In some examples, the network 280 is a network with the capability of being communicatively coupled to the Internet. However, the network 280 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The network 280 may enable the example VHM apparatus 100 to be in communication with the field device 104. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

While an example manner of implementing the valve health monitor (VHM) apparatus 100 of FIG. 1 is illustrated in FIG. 2, one or more of the elements, processes and/or devices illustrated in FIG. 2 may be combined, divided, re-arranged, omitted, eliminated, and/or implemented in any other way. Further, the example collection engine 200, the example database 210, the example parameter calculator 220, the example difference calculator 230, the example trend analyzer 240, the example outlier identifier 250, the example failure mode identifier 260, the example alert generator 270 and/or, more generally, the example VHM apparatus 100 of FIG. 2 may be implemented by hardware, software, firmware and/or any combination of hardware, software and/or firmware. Thus, for example, any of the example collection engine 200, the example database 210, the example parameter calculator 220, the example difference calculator 230, the example trend analyzer 240, the example outlier identifier 250, the example failure mode identifier 260, the example alert generator 270 and/or, more generally, the example VHM apparatus 100 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 200, the example database 210, the example parameter calculator 220, the example difference calculator 230, the example trend analyzer 240, the example outlier identifier 250, the example failure mode identifier 260, the example alert generator 270 and/or, more generally, the example VHM apparatus 100 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example VHM apparatus 100 of FIG. 2 may include one or more elements, processes and/or devices in addition to, or instead of, those illustrated in FIG. 2, and/or may include more than one of any or all of the illustrated elements, processes, and devices.

Flowcharts representative of example methods for implementing the example VHM apparatus 100 of FIG. 2 are shown in FIGS. 3-12. In these examples, the methods may be implemented using machine readable instructions that comprise a program for execution by a processor such as the processor 1612 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 3-12, many other methods of implementing the example VHM apparatus 100 may alternatively be used. For example, the order of execution of the blocks may be changed, and/or some of the blocks described may be changed, eliminated, or combined.

As mentioned above, the example methods of FIGS. 3-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 3:
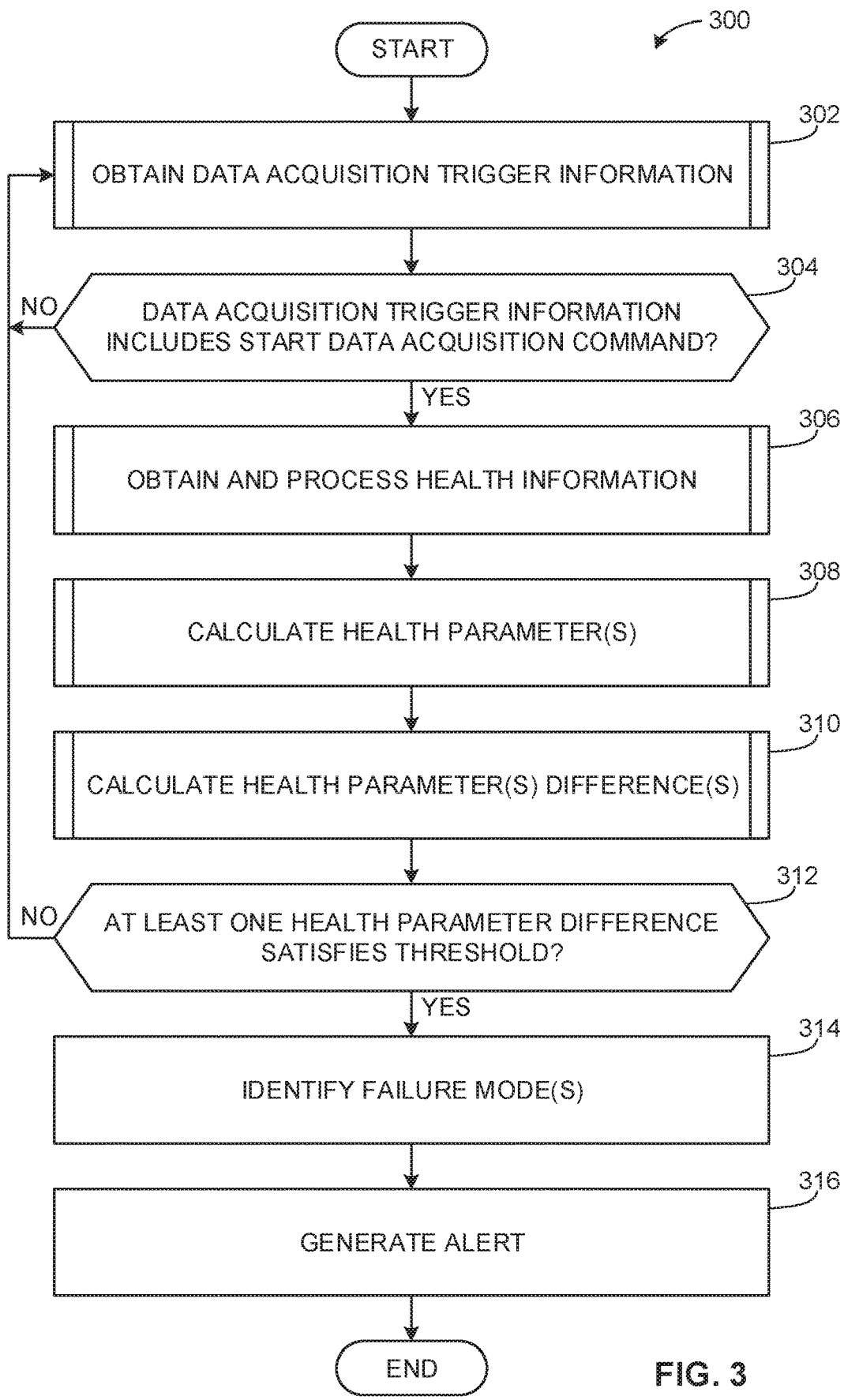
FIGS. 3-12 are flowcharts representative of example methods that may be performed using the example valve health monitor of FIG. 1 to monitor health information of a valve.

FIG. 3 is a flowchart representative of an example method 300 that may be performed by the example VHM apparatus 100 of FIG. 2 to obtain and process health information of a valve. The example method 300 begins at block 302 when the VHM apparatus 100 obtains data acquisition trigger information. For example, the collection engine 200 may obtain data acquisition trigger information from the field device 104 when the valve assembly 108 begins a full-stroke valve operation. At block 304, the VHM apparatus 100 determines whether the data acquisition trigger information includes a start data acquisition command. For example, the collection engine 200 may determine whether the data acquisition trigger information includes a start data acquisition command. If, at block 304, the VHM apparatus 100 determines that the data acquisition trigger information does not include the start data acquisition command, control returns to block 302 to obtain additional data acquisition trigger information. If, at block 304, the VHM apparatus 100 determines that the data acquisition trigger information does include the start data acquisition command, then, at block 306, the VHM apparatus 100 obtains and processes health information. For example, the collection engine 200 may obtain operational health information from the field device 104 for the valve assembly 108 and determine if the obtained operational health information includes one or more health parameters that require further calculation and/or processing.

At block 308, the VHM apparatus 100 calculates health parameter(s). For example, the parameter calculator 220 may convert (e.g., convert using a conversion calculation, converting to different units of measure, etc.), scale (e.g., scale using a scaling factor), translate (e.g., translate using a translation curve) and/or otherwise process the health parameter obtained from the operational health information into a format that may be used by the example VHM apparatus 100. At block 310, the VHM apparatus 100 calculates health parameter(s) difference(s). For example, the difference calculator 230 may determine a difference between a first operational value for a dead time health parameter obtained during a first time period and a second operational value for the dead time health parameter obtained during a second time period.

At block 312, the VHM apparatus 100 determines if at least one health parameter difference satisfies a threshold. For example, the difference calculator 230 may determine if the difference between the first operational value for the dead time health parameter and the second operational value for the dead time health parameter satisfies a threshold (e.g., the difference is greater than 100 milliseconds). If, at block 312, the VHM apparatus 100 determines that at least one health parameter difference does not satisfy the threshold, control returns to block 302 to obtain additional data acquisition trigger information. If, at block 312, the VHM apparatus 100 determines that at least one health parameter difference does satisfy the threshold, then, at block 314, the VHM apparatus 100 identifies failure mode(s). For example, the failure mode identifier 260 may determine that the difference between the first operational value for the dead time health parameter and the second operational value for the dead time health parameter is based on an obstruction of the valve 112 of FIG. 1. At block 316, the VHM apparatus 100 generates an alert. For example, the alert generator 270 may generate an alert based on the identified failure mode(s).

Figure 4:
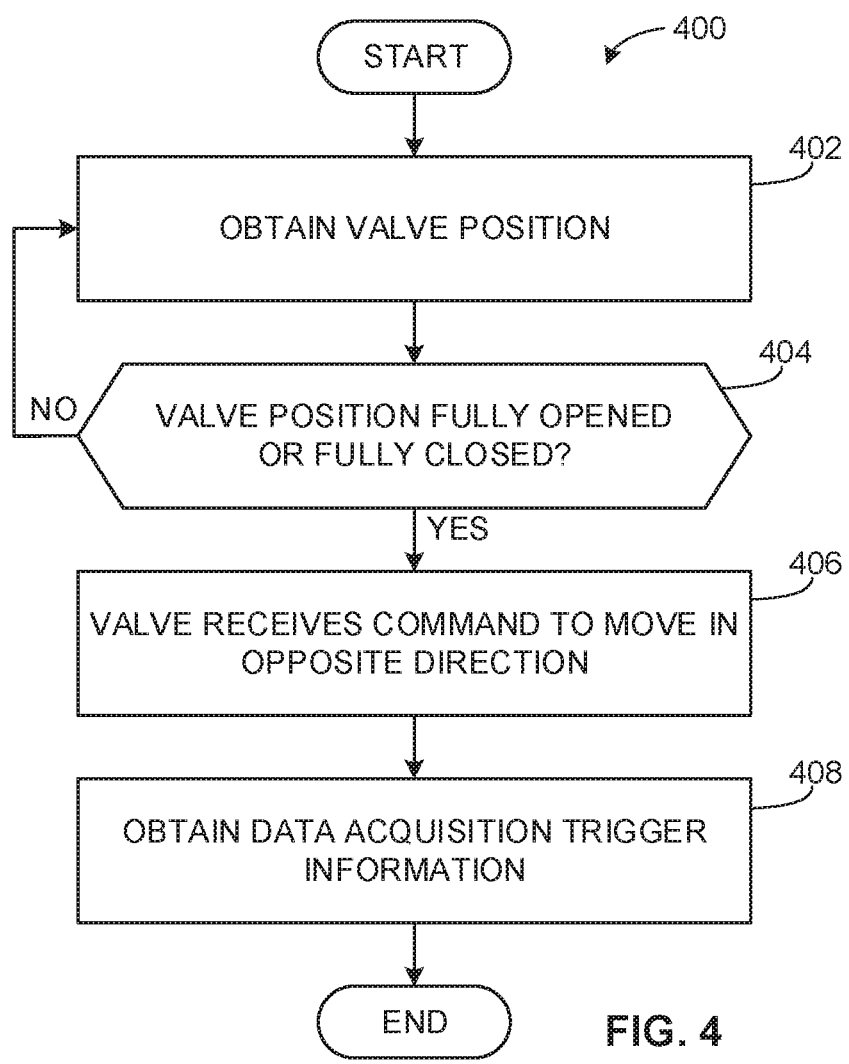

Additional detail in connection with obtaining data acquisition trigger information (FIG. 3 block 302) is shown in FIG. 4. FIG. 4 is a flowchart representative of an example method 400 that may be performed by the VHM apparatus 100 of FIG. 2 to obtain data acquisition trigger information. The example method 400 begins at block 402 when the VHM apparatus 100 obtains a valve position. For example, the collection engine 200 obtains a value for a valve position health parameter from the field device 104 for the valve 112 of FIG. 1. At block 404, the VHM apparatus 100 determines whether the valve position is fully opened or fully closed. For example, the collection engine 200 may determine that the valve position is fully opened based on the value for the valve position health parameter (e.g., the value indicates that the position of the valve 112 is 100% open). If, at block 404, the VHM apparatus 100 determines that the valve position is not fully opened or fully closed (e.g., the valve position is 25% open), control returns to block 402 to obtain an additional valve position. If, at block 404, the VHM apparatus 100 determines that the valve position is fully opened or fully closed (e.g., the valve 112 is 100% open, the valve 112 is 100% closed, etc.), then, at block 406, the valve receives a command to move in an opposite direction. For example, the field device 104 may receive a command from a communicatively coupled process control system to direct the valve 112 to move from fully opened to fully closed. At block 408, the VHM apparatus 100 obtains data acquisition trigger information. For example, the collection engine 200 may obtain data acquisition trigger information from the field device 104 in response to the field device 104 receiving the command to direct the valve 112 to move in the opposite direction. The data acquisition trigger information may include a start data acquisition command, an end data acquisition command, etc.

Figure 5:
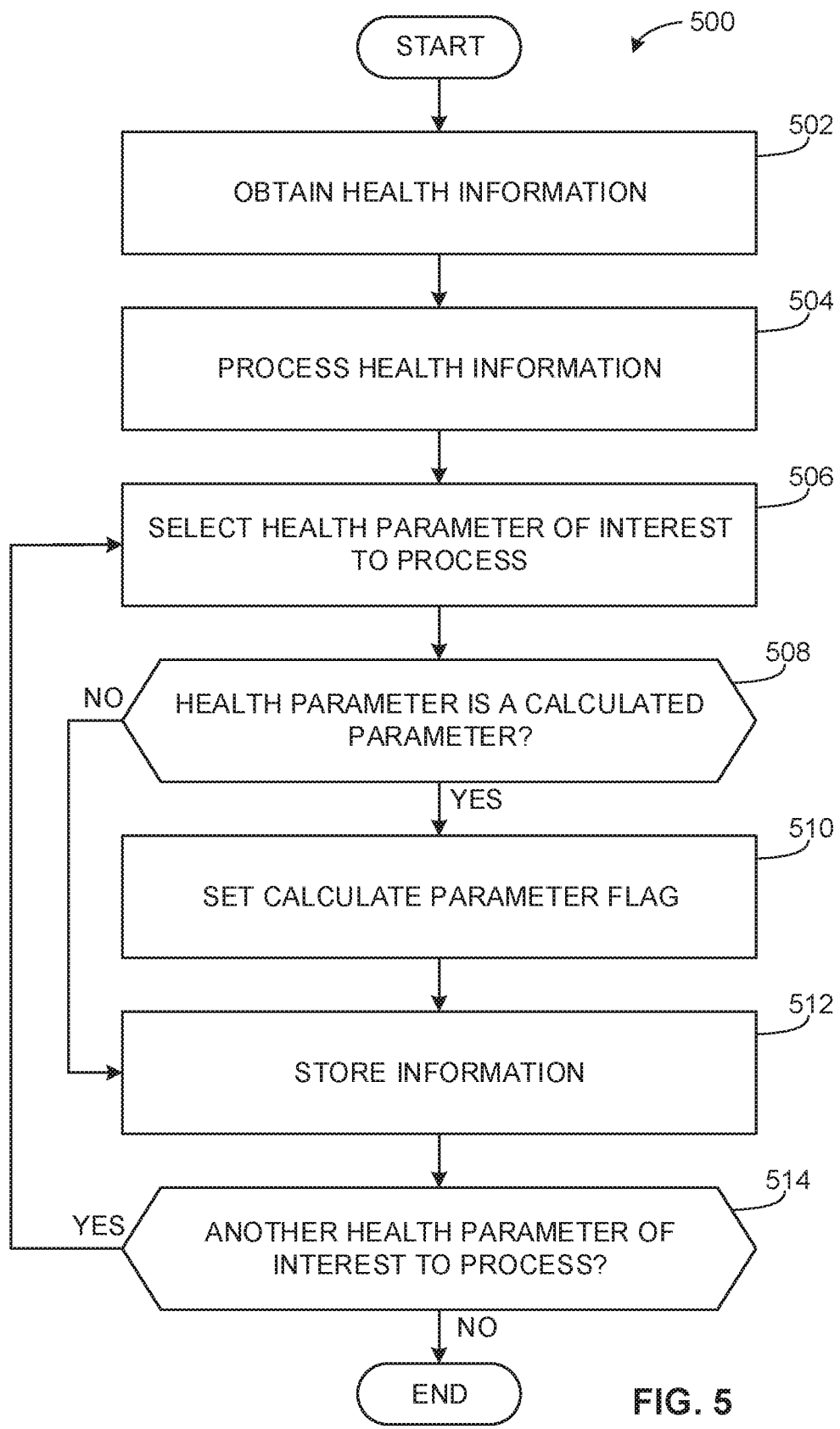

Additional detail in connection with obtaining and processing health information (FIG. 3 block 306) is shown in FIG. 5. FIG. 5 is a flowchart representative of an example method 500 that may be performed by the VHM apparatus 100 of FIG. 2 to obtain and process health information. The example method 500 begins at block 502 when the VHM apparatus 100 obtains health information. For example, the collection engine 200 may obtain operational health information from the field device 104 for the valve assembly 108 of FIG. 1. At block 504, the VHM apparatus processes the health information. For example, the collection engine 200 may sort the operational health information into one or more health parameters based on one or more data delimiters (e.g., a hash mark "#", a space, a comma, etc.). At block 506, the VHM apparatus 100 selects a health parameter of interest to process. For example, the collection engine 200 may select the stroke time health parameter for the valve assembly 108 to process.

At block 508, the VHM apparatus 100 determines whether the health parameter is a calculated parameter. For example, the collection engine 200 may determine that the gain value health parameter (e.g., the value calculated by dividing a percentage of valve position change by a percentage of command signal change) requires further calculation. If, at block 508, the VHM apparatus 100 determines that the health parameter is not a calculated parameter, control proceeds to block 512 to store information. If, at block 508, the VHM apparatus 100 determines that the health parameter is a calculated parameter, then, at block 510, the VHM apparatus 100 sets a calculate parameter flag. For example, the collection engine 200 may set a calculate parameter flag when the collection engine 200 determines that the health parameter is a calculated parameter. At block 512, the VHM apparatus 100 stores information. For example, the collection engine 200 may store the calculate parameter flag in the database 210. At block 514, the VHM apparatus 100 determines whether there is another health parameter of interest to process. For example, the collection engine 200 may determine whether there is another health parameter of interest to process. If, at block 514, the VHM apparatus 100 determines there is another health parameter of interest to process, control returns to block 506 to select another health parameter of interest to process, otherwise the example method 500 concludes.

Figure 6:
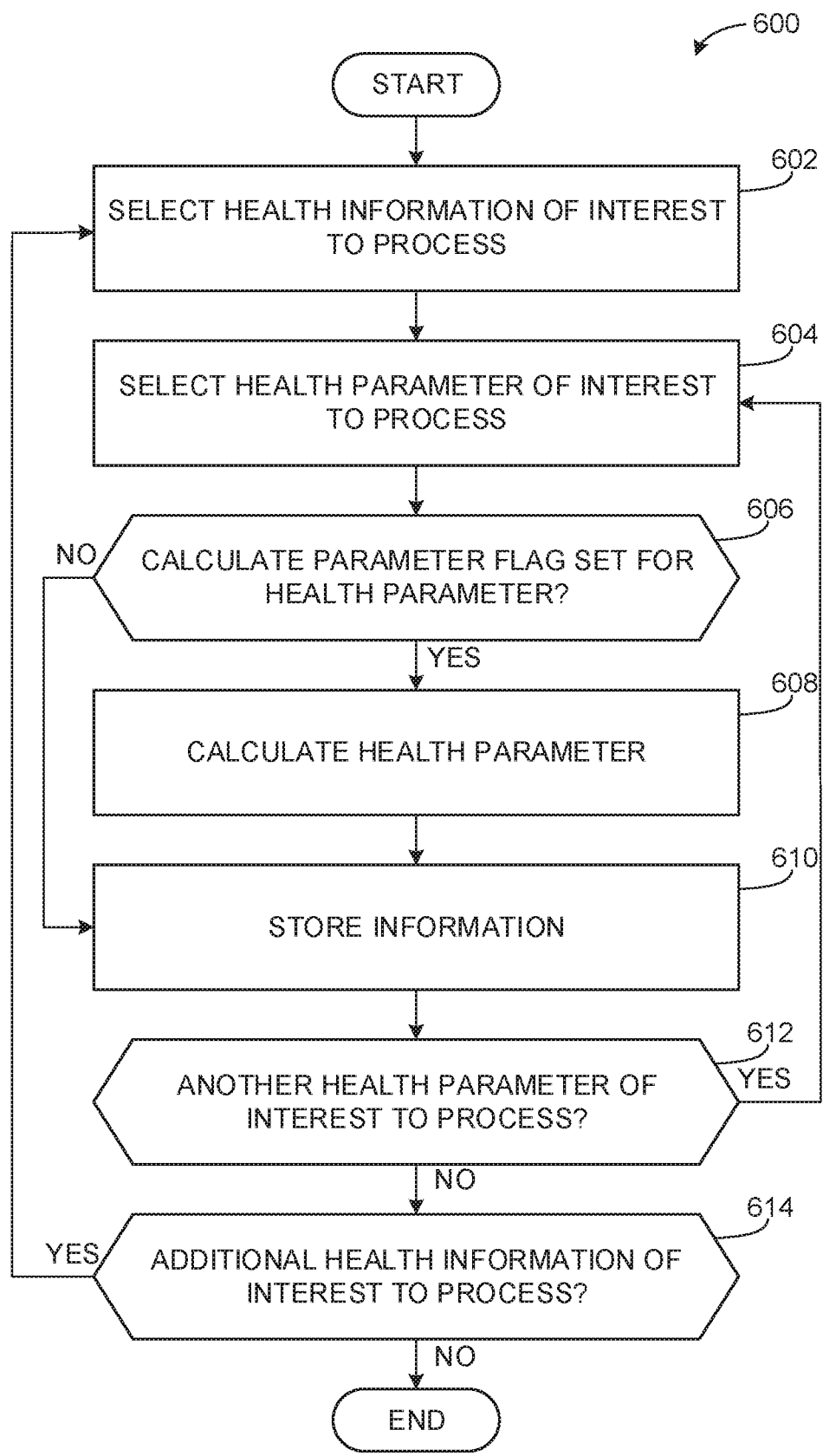

Additional detail in connection with calculating health parameter(s) (FIG. 3 block 308) is shown in FIG. 6. FIG. 6 is a flowchart representative of an example method 600 that may be performed by the VHM apparatus 100 of FIG. 2 to calculate the health parameter(s). The example method 600 begins at block 602 when the VHM apparatus 100 selects health information of interest to process. For example, the collection engine 200 may select operational health information for the valve assembly 108 for a time period of interest to process. At block 604, the VHM apparatus 100 selects a health parameter of interest to process. For example, the collection engine 200 may select the dead time health parameter for the valve assembly 108 to process.

At block 606, the VHM apparatus 100 determines whether a calculate parameter flag is set for the health parameter. For example, the collection engine 200 may determine that the calculate parameter flag is set for the dead time health parameter for the valve assembly 108. If, at block 606, the VHM apparatus 100 determines that the calculate parameter flag is not set for the health parameter, control proceeds to block 610 to store information. For example, the collection engine 200 may store the value for the actuator pressure health parameter in the database 210. If, at block 606, the VHM apparatus 100 determines that the calculate parameter flag is set for the health parameter, then, at block 608, the VHM apparatus 100 calculates the health parameter. For example, the parameter calculator 220 may calculate the dead time health parameter based on the selected operational health information for the valve assembly 108.

At block 610, the VHM apparatus 100 stores information. For example, the parameter calculator 220 may store the calculated value for the dead time health parameter in the database 210. At block 612, the VHM apparatus 100 determines whether there is another health parameter of interest to process. For example, the collection engine 200 may determine whether there is another health parameter of interest to process. If, at block 612, the VHM apparatus 100 determines there is another health parameter of interest to process, control returns to block 604 to select another health parameter of interest to process. If, at block 612, the VHM apparatus 100 determines there is not another health parameter of interest to process (e.g., the database 210 returns a null index, etc.), then, at block 614, the VHM apparatus 100 determines if there is additional health information of interest to process. For example, the collection engine 200 may determine if there is additional health information of interest to process. If, at block 614, the VHM apparatus 100 determines there is additional health information of interest to process, control returns to block 602 to select additional health information of interest to process, otherwise the example method 600 concludes.

Figure 7:
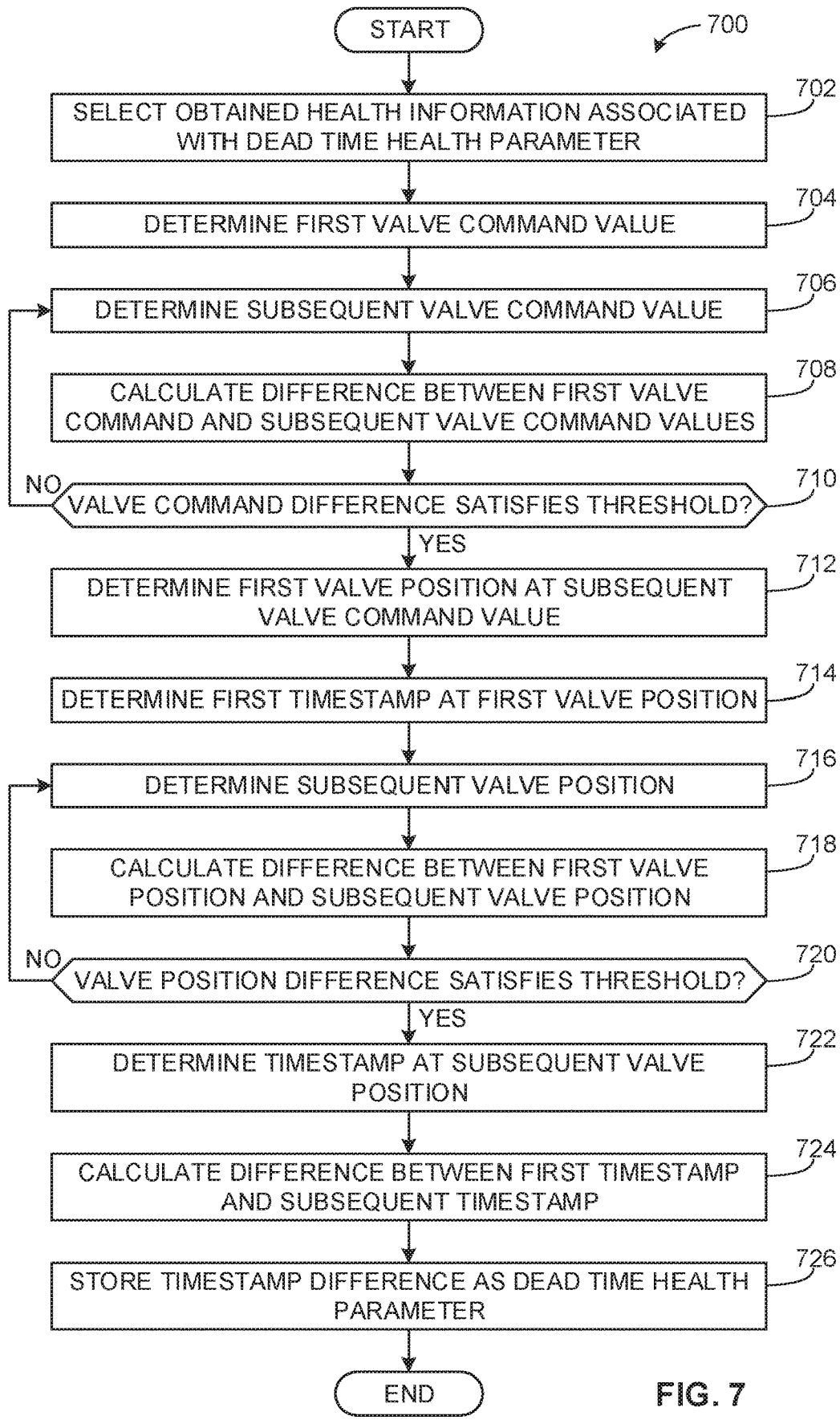

FIG. 7 is a flowchart representative of an example method 700 that may be performed by the VHM apparatus 100 of FIG. 2 to calculate a dead time health parameter associated with a valve. The example method 700 begins at block 702 when the VHM apparatus 100 selects obtained health information associated with the dead time health parameter. For example, the collection engine 200 may select the obtained operational health information associated with the dead time health parameter from the database 210. The obtained operational health information associated with the dead time health parameter may include valve command information, valve position information, and timestamp information. At block 704, the VHM apparatus 100 determines a first valve command value. For example, the collection engine 200 may obtain the first valve command value.

At block 706, the VHM apparatus 100 determines a subsequent valve command value. For example, the collection engine 200 may obtain the subsequent valve command value. At block 708, the VHM apparatus 100 calculates a difference between the first valve command and the subsequent valve command values. For example, the parameter calculator 220 may calculate the difference between the first valve command value (e.g., 4.0 milliamps) and the subsequent valve command value (e.g., 20.0 milliamps). At block 710, the VHM apparatus 100 determines whether the valve command difference satisfies a threshold. For example, the parameter calculator 220 may determine whether the difference satisfies a threshold (e.g., the difference is greater than 0.5 milliamps). If, at block 710, the VHM apparatus 100 determines that the valve command difference does not satisfy the threshold, control returns to block 706 to determine another subsequent valve command value. If, at block 710, the VHM apparatus 100 determines that the valve command difference does satisfy the threshold, then, at block 712, the VHM apparatus 100 determines a first valve position at the subsequent valve command value. For example, the parameter calculator 220 may determine the first value for the valve position health parameter to be 0% open at the subsequent valve command value of 20 milliamps.

At block 714, the VHM apparatus 100 determines a first timestamp at the first valve position. For example, the parameter calculator 220 may determine the first timestamp associated with the first value for the valve position health parameter (e.g., 0% open). At block 716, the VHM apparatus 100 determines a subsequent valve position. For example, the parameter calculator 220 may determine a second value for the valve position health parameter (e.g., 1% open). At block 718, the VHM apparatus 100 calculates a difference between the first valve position and the subsequent valve position. For example, the parameter calculator 220 may calculate a difference between the first value for the valve position health parameter (e.g., 0% open) and the second value for the valve position health parameter (e.g., 1% open).

At block 720, the VHM apparatus 100 determines whether the valve position difference satisfies a threshold. For example, the parameter calculator 220 may determine whether the valve position difference (e.g., the valve position difference of 1%) satisfies the threshold (e.g., the difference is greater than 2%). If, at block 720, the VHM apparatus 100 determines that the valve position difference does not satisfy the threshold, control returns to block 716 to determine another subsequent valve position. If, at block 720, the VHM apparatus 100 determines that the valve position difference does satisfy the threshold, then, at block 722, the VHM apparatus 100 determines a timestamp at the subsequent valve position. For example, the parameter calculator 220 may determine a second timestamp corresponding to the subsequent value for the valve position health parameter. At block 724, the VHM apparatus 100 calculates a difference between the first timestamp and the subsequent timestamp. For example, the parameter calculator 220 may calculate the timestamp difference between the first timestamp and the second timestamp. At block 726, the VHM apparatus 100 stores the timestamp difference as the dead time health parameter. For example, the parameter calculator 220 may store the timestamp difference as the dead time health parameter in the database 210.

Figure 8:
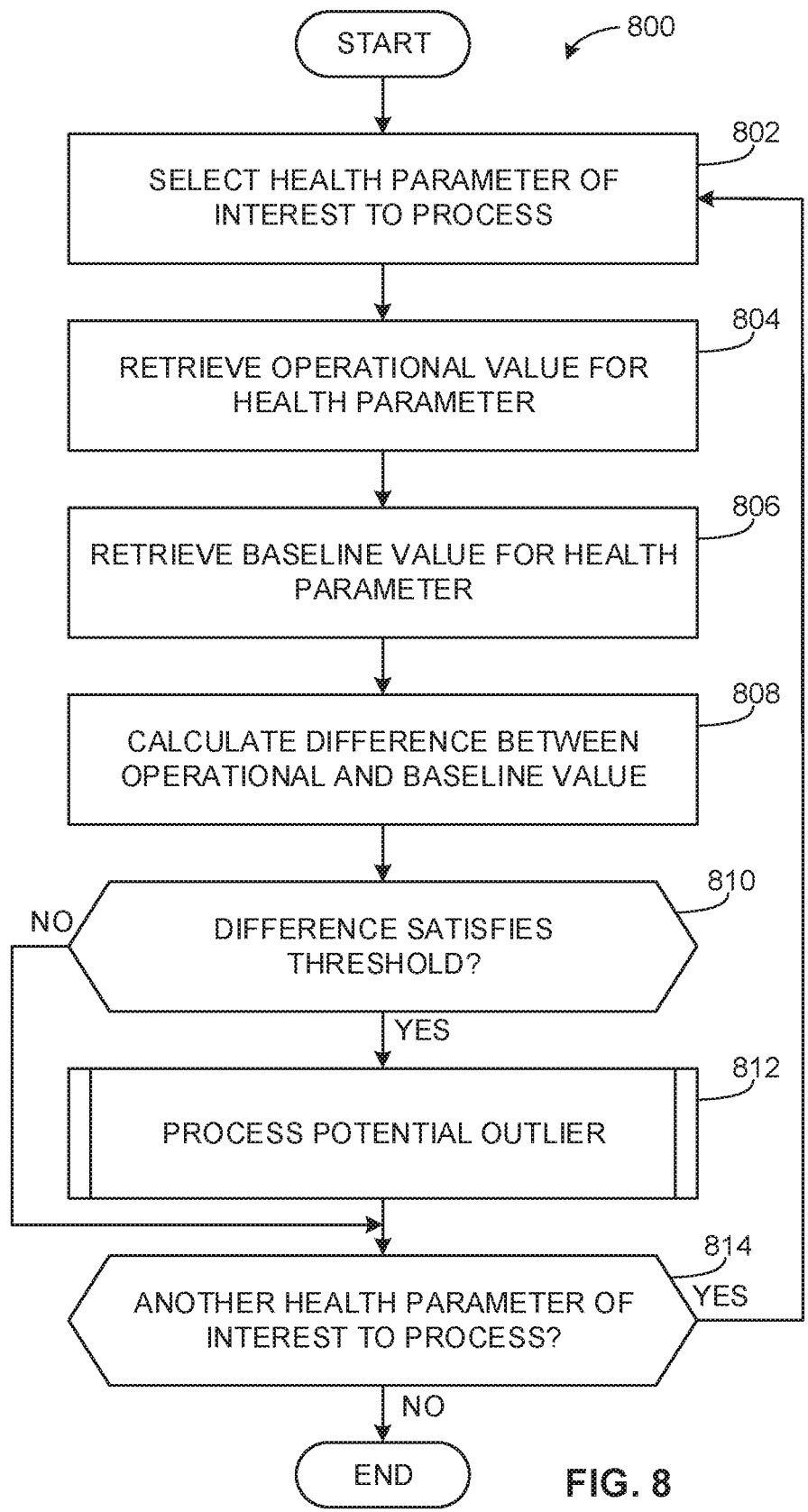

Additional detail in connection with calculating health parameter(s) difference(s) (FIG. 3 block 310) is shown in FIG. 8. FIG. 8 is a flowchart representative of an example method 800 that may be performed by the VHM apparatus 100 of FIG. 2 to calculate a difference between an operational value and a baseline value for one or more health parameters. The example method 800 begins at block 802 when the VHM apparatus 100 selects a health parameter of interest to process. For example, the collection engine 200 may select an actuator pressure health parameter from the database 210 to process. At block 804, the VHM apparatus 100 retrieves an operational value for the health parameter. For example, the difference calculator 230 may retrieve the operational value for the actuator pressure health parameter from the database 210. In some examples, the operational value may be the most recently obtained and processed operational value by the VHM apparatus 100. For example, the operational value may be the first operational value in a first-in first-out (FIFO) buffer queue that was obtained and/or processed by the collection engine 200 and/or stored in the database 210. At block 806, the VHM apparatus 100 retrieves a baselines value for the health parameter. For example, the difference calculator 230 may retrieve the baseline value for the actuator pressure health parameter from the database 210.

At block 808, the VHM apparatus 100 calculates a difference between the operational and baseline value. For example, the difference calculator 230 may calculate a difference between the operational value for the actuator pressure health parameter and the baseline value for the actuator pressure health parameter. At block 810, the VHM apparatus 100 determines whether the difference satisfies a threshold. For example, the difference calculator 230 may determine whether the difference satisfies the threshold (e.g., the difference is greater than 10 PSI, the difference is greater than 500 milliseconds, etc.). If, at block 810, the VHM apparatus 100 determines that the difference does not satisfy the threshold, control proceeds to block 814 to determine if there is another health parameter of interest to process. If, at block 810, the VHM apparatus 100 determines that the difference does satisfy the threshold, then, at block 812, the VHM apparatus 100 processes a potential outlier. For example, the outlier identifier 250 may process the potential outlier. At block 814, the VHM apparatus 100 determines whether there is another health parameter of interest. For example, the collection engine 200 may determine whether there is another health parameter of interest to process. If, at block 814, the VHM apparatus 100 determines there is another health parameter of interest to process, control returns to block 802 to select another health parameter of interest to process, otherwise the example method 800 concludes.

Figure 9:
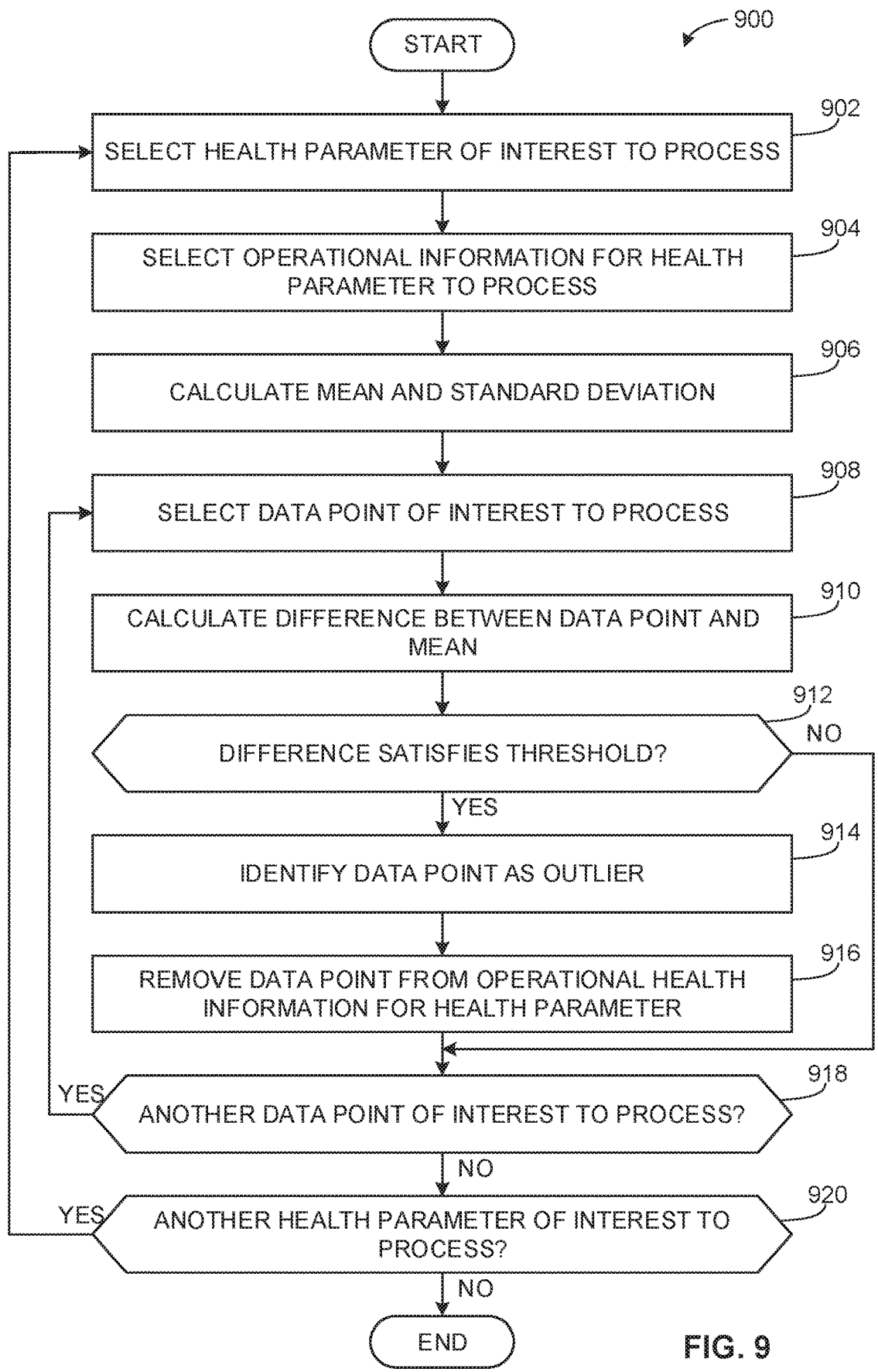

Additional detail in connection with processing a potential outlier (FIG. 8 block 812) is shown in FIG. 9. FIG. 9 is a flowchart representative of an example method 900 that may be performed by the VHM apparatus 100 of FIG. 2 to process a potential outlier value for one or more health parameters. The example method 900 begins at block 902 when the VHM apparatus 100 selects a health parameter of interest to process. For example, the collection engine 200 may select a dead time health parameter to process. At block 904, the VHM apparatus 100 selects operational information for the health parameter to process. For example, the collection engine 200 may select operational health information for the dead time health parameter to process. The operational information may include values for the dead time health parameter during an example time period (e.g., an hour, a day, a month, etc.) that includes one or more outlier values. At block 906, the VHM apparatus 100 calculates a mean value and a standard deviation value. For example, the outlier identifier 250 may calculate a mean value and a standard deviation value based on the operational health information for the dead time health parameter.

At block 908, the VHM apparatus 100 selects a data point of interest to process. For example, the collection engine 200 may select the data point within the operational health information for the dead time health parameter to process. At block 910, the VHM apparatus 100 calculates a difference between the data point and the mean. For example, the outlier identifier 250 may calculate the difference between the dead time health parameter data point for the dead time health parameter and the operational information mean for the dead time health parameter.

At block 912, the VHM apparatus 100 determines if the difference satisfies a threshold. For example, the outlier identifier 250 may determine whether the difference satisfies the threshold. In some examples, user input determines the threshold. In some instances, the threshold is one or more standard deviation values. Additionally or alternatively, the threshold may be generated (e.g., adjusted, created, modified, etc.) based on current health information and/or past health information for the valve assembly 108. Alternatively, the threshold may be generated based on current health information and/or past health information obtained from another valve assembly. If, at block 912, the VHM apparatus 100 determines if the difference does not satisfy the threshold (e.g., the difference is less than one standard deviation value), control proceeds to block 918 to determine whether there is another data point of interest to process. If, at block 912, the VHM apparatus 100 determines if the difference does satisfy the threshold (e.g., the difference is greater than one standard deviation value), then, at block 914, the VHM apparatus 100 identifies the data point as an outlier. For example, the outlier identifier 250 may identify the data point as the outlier.

At block 916, the VHM apparatus 100 removes the data point from the operational health information for the health parameter. For example, the outlier identifier 250 may remove the data point from the operational health information for the dead time health parameter. In some examples, the outlier is stored in the database 210 for further analysis and/or for generation of an alert. At block 918, the VHM apparatus 100 determines whether there is another data point of interest to process. For example, the collection engine 200 may determine whether there is another data point of interest to process. If, at block 918, the VHM apparatus 100 determines there is another data point of interest to process, control returns to block 908 to select another data point of interest to process. If, at block 918, the VHM apparatus 100 determines there is not another data point of interest to process (e.g., the database 210 returns a null index, etc.), then, at block 920, the VHM apparatus 100 determines if there is another health parameter of interest to process. For example, the collection engine 200 may determine if there is another health parameter of interest to process. If, at block 918, the VHM apparatus 100 determines there is another health parameter of interest to process, control returns to block 902 to select another health parameter of interest to process, otherwise the example method 900 concludes.

Figure 10:
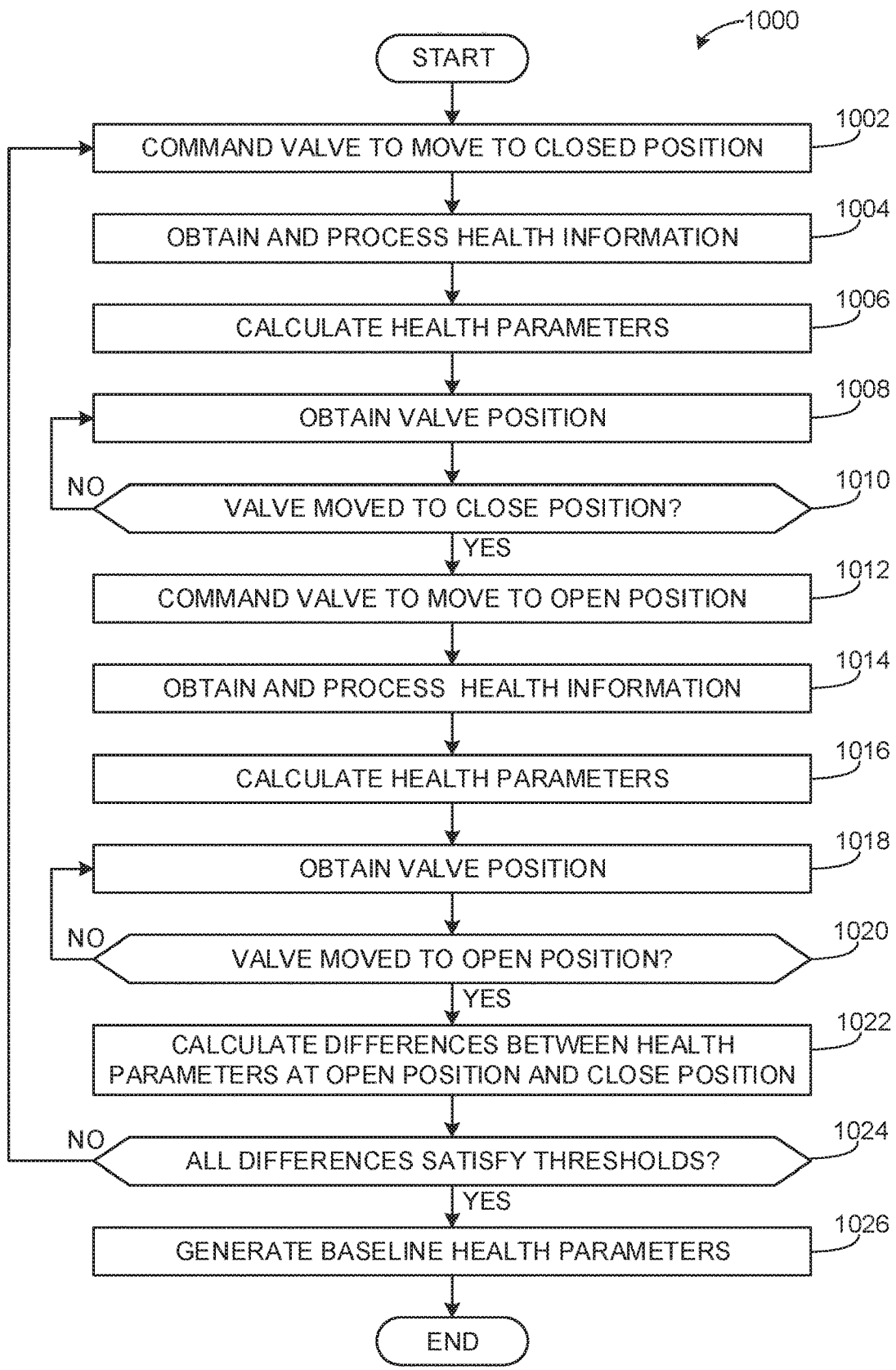

FIG. 10 is a flowchart representative of an example method 1000 that may be performed by the VHM apparatus 100 of FIG. 2 to generate baseline health parameters associated with a valve. For example, the VHM apparatus 100 may be used to generate baseline values for health parameters for the valve assembly 108 of FIG. 1. The example method 1000 begins at block 1002 when the field device 104 commands the valve to move to a closed position. Alternatively, the VHM apparatus 100 may command the valve to move to a closed position or a user may manually move the valve to a closed position. For example, the collection engine 200 may transmit a command to a process control system communicatively coupled to the field device 104 to direct the valve 112 to move to a closed position (e.g., a position approximately 100% closed). At block 1004, the VHM apparatus 100 obtains and processes health information. For example, the collection engine 200 may obtain and process baseline health information from the field device 104 for the valve assembly 108. In some examples, the VHM apparatus 100 obtains and processes baseline health information in accordance with the example method 500. At block 1006, the VHM apparatus 100 calculates health parameters. For example, the parameter calculator 220 may calculate one or more health parameters based on the obtained baseline health information. In some instances, the VHM apparatus 100 calculates the health parameters in accordance with the example method 600.

At block 1008, the VHM apparatus 100 obtains a valve position. For example, the collection engine 200 may obtain a value for the valve position health parameter for the valve assembly 108 (e.g., the valve 112 is 25% open). At block 1010, the VHM apparatus 100 determines whether the valve moved to the closed position. For example, the collection engine 200 may determine whether the valve 112 moved to the closed position (e.g., the position where the valve 112 is approximately 100% closed). If, at block 1010, the VHM apparatus 100 determines that the valve did not move to the closed position, control returns to block 1008 to obtain another valve position. If, at block 1010, the VHM apparatus 100 determines that the valve did move to the closed position, then, at block 1012, the field device 104 commands the valve to move to an open position. Alternatively, the VHM apparatus 100 may command the valve to move to an open position or a user may manually move the valve to an open position. For example, the collection engine 200 may transmit a command to the process control system communicatively coupled to the field device 104 to direct the valve 112 to move to the open position (e.g., the position where the valve 112 is approximately 100% open).

At block 1014, the VHM apparatus 100 obtains and processes health information. For example, the collection engine 200 may obtain and process baseline health information from the field device 104 for the valve assembly 108. In some examples, the VHM apparatus 100 obtains and processes baseline health information in accordance with the example method 500. At block 1016, the VHM apparatus 100 calculates the health parameters. For example, the parameter calculator 220 may calculate the one or more health parameters based on the obtained baseline health information. In some instances, the VHM apparatus 100 calculates the health parameters in accordance with the example method 600.

At block 1018, the VHM apparatus 100 obtains a valve position. For example, the collection engine 200 may obtain a value for the valve position health parameter for the valve assembly 108 (e.g., the valve 112 is 25% closed). At block 1020, the VHM apparatus 100 determines whether the valve moved to the open position. For example, the collection engine 200 may determine whether the valve 112 moved to the open position (e.g., the position where the valve 112 is approximately 100% open). If, at block 1020, the VHM apparatus 100 determines that the valve did not move to the open position, control returns to block 1018 to obtain another valve position. If, at block 1020, the VHM apparatus 100 determines that the valve did move to the open position, then, at block 1022, the VHM apparatus 100 calculates differences between the health parameters at the open position and the closed position. For example, the difference calculator 230 may calculate the difference between the baseline value for the dead time health parameter at the open position and the baseline value for the dead time health parameter at the closed position.

At block 1024, the VHM apparatus 100 determines whether all of the differences satisfy their respective thresholds. For example, the difference calculator 230 may determine whether the difference between the value for the dead time health parameter at the open position and the value for the dead time health parameter at the closed position satisfies a threshold (e.g., the difference is greater than 10 milliseconds). If, at block 1024, the VHM apparatus 100 determines that not all of the differences satisfy their respective thresholds, control returns to block 1002 to command the valve to move to the closed position. If, at block 1024, the VHM apparatus 100 determines that all of the differences satisfy their respective thresholds, then, at block 1026, the VHM apparatus generates baseline values for the health parameters. For example, the difference calculator 230 may store calculated baseline values for the health parameters at the open position in the database 210. In another example, the difference calculator 230 may store the calculated baseline values for the health parameters at the closed position in the database 210. Alternatively, the example method 1000 may be executed for a single health parameter.

Figure 11:
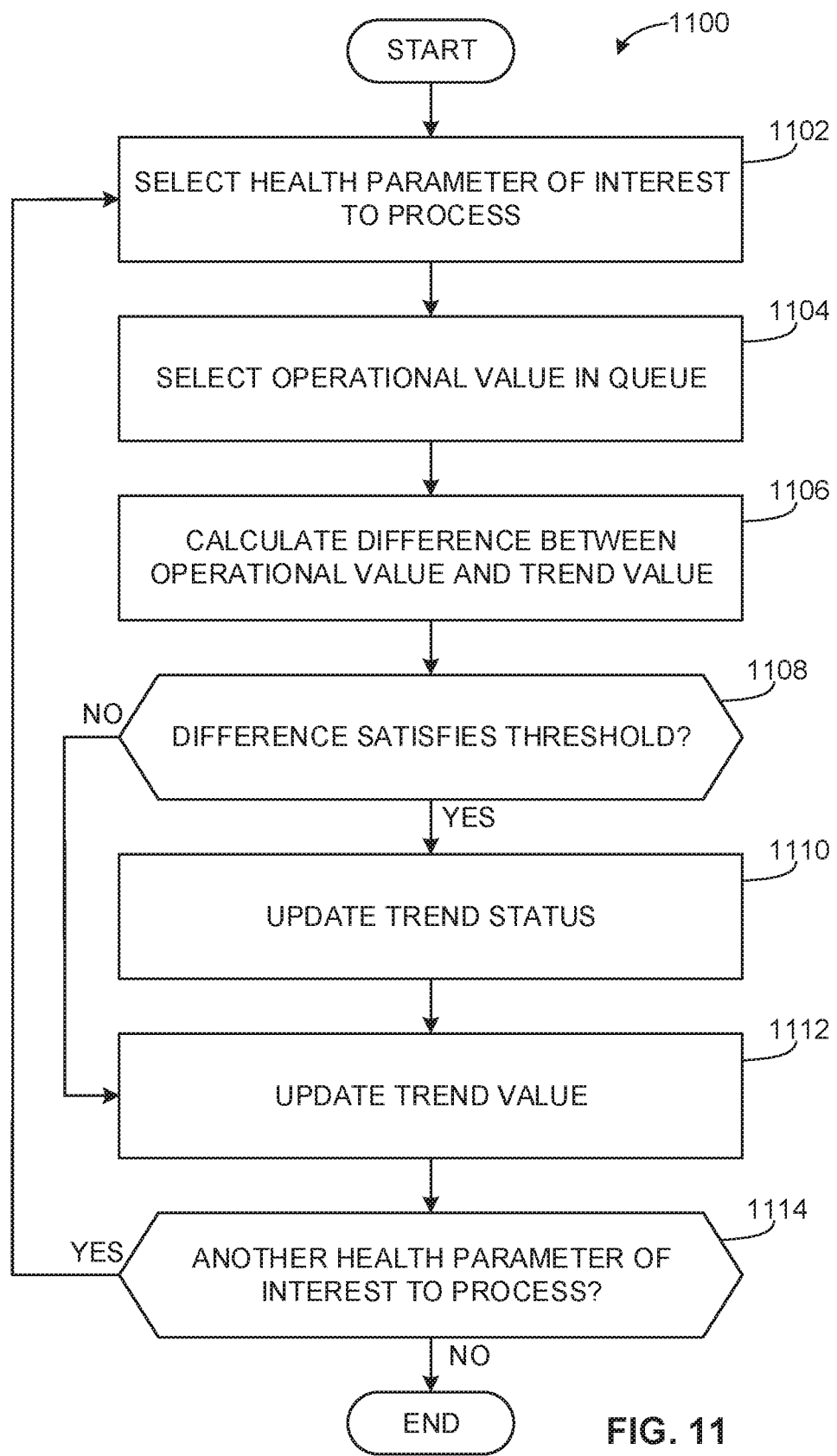

FIG. 11 is a flowchart representative of an example method 1100 that may be performed by the VHM apparatus 100 of FIG. 2 to analyze a trend of operational values for a health parameter associated with a valve. The example method 1100 begins at block 1102, when the VHM apparatus selects a health parameter of interest to process. For example, the collection engine 200 may select an actuator pressure health parameter associated with the valve assembly 108 of FIG. 1 to process. At block 1104, the VHM apparatus 100 selects an operational value in a queue. For example, the collection engine 200 may retrieve the operational value for the actuator pressure health parameter from the database 210. In some examples, the operational value may be the most recently obtained and/or processed operational value by the VHM apparatus 100. For example, the operational value may be the first operational value in a first-in first-out (FIFO) buffer queue that was obtained and/or processed by the collection engine 200. At block 1106, the VHM apparatus 100, calculates a difference between the operational value and a trend value. For example, the trend analyzer 240 may calculate a difference between the operational value for the actuator pressure health parameter and the trend value for the actuator pressure health parameter.

At block 1108, the VHM apparatus 100 determines whether the difference satisfies a threshold. For example, the trend analyzer 240 may determine whether the difference satisfies the threshold (e.g., the difference is greater than 10 PSI). If, at block 1108, the VHM apparatus 100 determines that the difference does not satisfy the threshold, control proceeds to block 1112, to update the trend value. If, at block 1108, the VHM apparatus 100 determines that the difference satisfies the threshold, then, at block 1110, the VHM apparatus 100 updates a trend status. For example, the trend analyzer 240 may update the trend status of the actuator pressure health parameter.

At block 1112, the VHM apparatus 100 updates the trend value. For example, the trend analyzer 240 may update the trend value for the actuator pressure health parameter. In some examples, the trend analyzer 240 replaces the previous trend value with the operational value selected at block 1104. In some instances, the trend analyzer 240 recalculates a moving-window average to include the operational value selected at block 1104. At block 1114, the VHM apparatus 100 determines whether there is another health parameter of interest to process. For example, the collection engine 200 may determine whether there is another health parameter of interest to process. If, at block 1114, the VHM apparatus 100 determines there is another health parameter of interest, control returns to block 1102 to select another health parameter of interest to process, otherwise the example method 1100 concludes.

Figure 12:
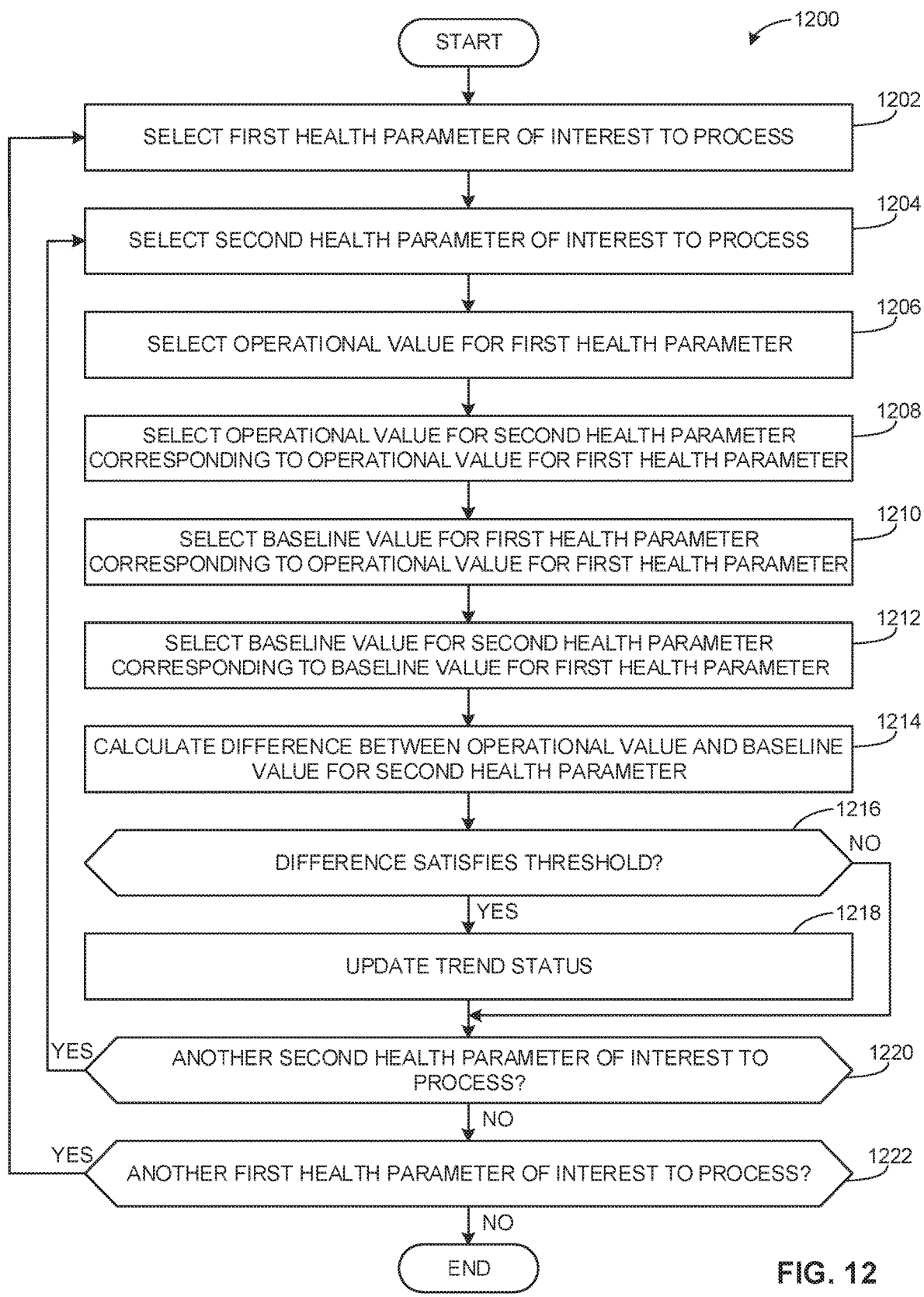

FIG. 12 is a flowchart representative of an example method 1200 that may be performed by the VHM apparatus 100 of FIG. 2 to analyze a trend of values for two or more health parameters associated with a valve. The example method 1200 begins at block 1202, when the VHM apparatus 100 selects a first health parameter of interest to process. For example, the collection engine 200 may select a valve position health parameter associated with the valve assembly 108 of FIG. 1. At block 1204, the VHM apparatus 100 selects a second health parameter of interest to process. For example, the collection engine 200 may select an actuator pressure health parameter associated with the valve assembly 108 of FIG. 1. At block 1206, the VHM apparatus 100 selects an operational value for the first health parameter. For example, the trend analyzer 240 may select the operational value for the valve position health parameter from the database 210. At block 1208, the VHM apparatus 100 selects an operational value for the second health parameter corresponding to the operational value for the first health parameter. For example, the trend analyzer 240 may select the operational value for the actuator pressure health parameter (e.g., 12 PSIG) corresponding to the operational value of the valve position health parameter (e.g., the position of the valve 112 is 40% open).

At block 1210, the VHM apparatus 100 selects a baseline value for the first health parameter corresponding to the operational value for the first health parameter. For example, the trend analyzer 240 may select the baseline value for the valve position health parameter (e.g., the position of the valve 112 is 40% open) corresponding to the operational value for the valve position health parameter (e.g., the position of the valve 112 is 40% open). At block 1212, the VHM apparatus 100 selects a baseline value for the second health parameter corresponding to the baseline value for the first health parameter. For example, the trend analyzer 240 may select the baseline value for the actuator pressure health parameter (e.g., 14 PSIG) corresponding to the baseline value for the valve position health parameter (e.g., the position of the valve 112 is 40% open).

At block 1214, the VHM apparatus 100 calculates a difference between the operational value and the baseline value for the second health parameter. For example, the trend analyzer 240 may calculate the difference between the operational value for the actuator pressure health parameter (e.g., 12 PSIG) and the baseline value for the actuator pressure health parameter (e.g., 14 PSIG). At block 1216, the VHM apparatus 100 determines whether the difference satisfies a threshold. For example, the trend analyzer 240 may determine whether the difference (e.g., 12 PSIG−10 PSIG=2 PSIG) satisfies a threshold (e.g., the difference is greater than 5 PSIG). If, at block 1216, the VHM apparatus 100 determines that the difference does not satisfy the threshold, control proceeds to block 1220 to determine whether there is another second health parameter of interest to process. If, at block 1216, the VHM apparatus 100 determines that the difference does satisfy the threshold, then, at block 1218, the VHM apparatus 100 updates a trend status. For example, the trend analyzer 240 may update the trend status.

At block 1220, the VHM apparatus 100 determines whether there is another second health parameter of interest to process. For example, the collection engine 200 may determine that there is another health parameter that can be analyzed with respect to the valve position health parameter. If, at block 1220, the VHM apparatus 100 determines that there is another second health parameter of interest to process, control returns to block 1204 to select another second health parameter of interest to process. If, at block 1220, the VHM apparatus 100 determines that there is not another second health parameter of interest to process, then, at block 1222, the VHM apparatus 100 determines whether there is another first health parameter of interest to process. For example, the collection engine 200 may determine that there is another health parameter that can be utilized as a base reference, where additional health parameters can be analyzed with respect to the base reference. If, at block 1222, the VHM apparatus 100 determines that there is another first health parameter of interest to process, control returns to block 1202 to select another first health parameter of interest to process, otherwise the example method 1200 concludes.

Figure 13:
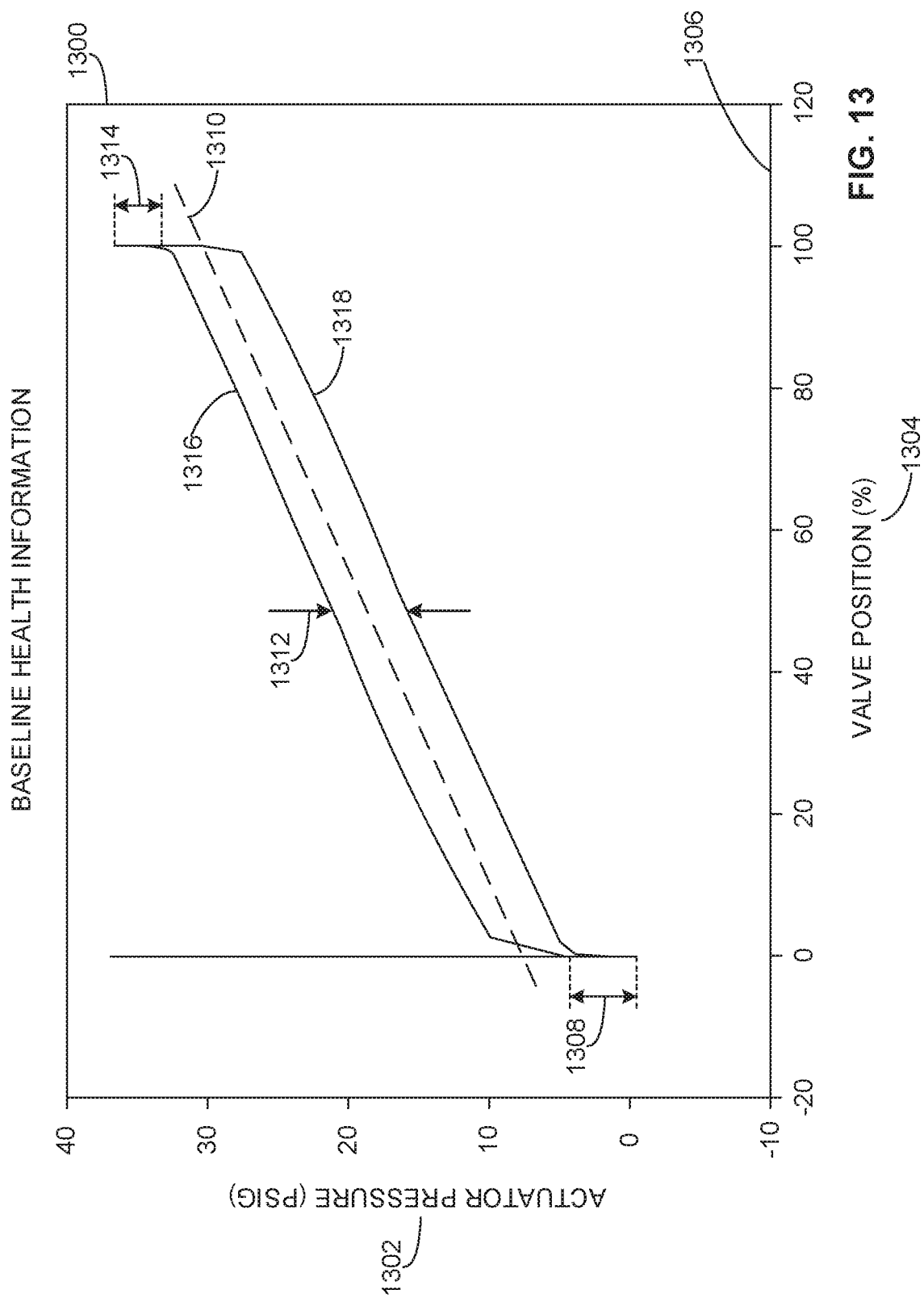
FIG. 13 is an example graph depicting health information of a valve during a baseline process.

FIG. 13 is a graph depicting health information of a valve during a baseline process (e.g., baseline health information). For example, the graph of FIG. 13 may depict baseline health information of the valve assembly 108 of FIG. 1 obtained during the baseline process. The graph of FIG. 13 depicts a plot 1300 of actuator pressure 1302 as a function of valve position 1304. The actuator pressure 1302 is in a unit of measure of pounds per square inch gauge (PSIG). The valve position 1304 is in a unit of measure of percentage. The valve position axis 1306 ranges from −20% to 120%, where 0% refers to the valve position 1304 of 0% open or fully closed and 100% refers to the valve position 1304 of 100% open or fully opened.

In some examples, the VHM apparatus 100 develops the plot 1300 based on baseline health information. For example, the parameter calculator 220 may develop the plot 1300 to calculate baseline values for health parameters for the valve assembly 108. In some instances, the parameter calculator 220 produces the plot 1300 for every complete full-stroke operation (e.g., the valve 112 traveling from fully closed to fully opened and from fully opened back to fully closed) of the valve assembly 108 of FIG. 1 during a baseline process. The parameter calculator 220 may calculate health parameters such as, for example, a seat load estimate 1308, a bench set estimate 1310 (e.g., a theoretical actuator pressure estimate), a two-times friction estimate 1312, a friction estimate, a spring rate, an available force estimate 1314, etc. The VHM apparatus 100 may store the calculated health parameters in the database 210. For example, the parameter calculator 220 may store the baseline values for the seat load estimate 1308, the bench set estimate 1310, the two-times friction estimate 1312, the friction estimate, the spring rate, the available force estimate 1314, etc. in the database 210.

In the illustrated example of FIG. 13, the parameter calculator 220 calculates the baseline value for the seat load estimate 1308 by calculating a difference between the actuator pressure 1302 at the valve position 1304 of 1% and the actuator pressure 1302 at the valve position 1304 of 0%. The baseline value for the seat load estimate 1308 may be an amount of pressure from a spring of the valve 112 if all actuator pressure 1302 was removed from the valve 112. For example, the parameter calculator 220 may determine the baseline value for the seat load estimate to be approximately 5 PSIG (e.g., (4 PSIG at the valve position of 1%)−(−1 PSIG at the valve position of 0%)=5 PSIG) based on the plot 1300.

In the illustrated example of FIG. 13, the VHM apparatus 100 calculates the baseline value for the bench set estimate 1310 based on the actuator pressure 1302 at the valve position 1304 of 0% and at the valve position 1304 of 100%. The example VHM apparatus 100 then extrapolates a line for the bench set estimate 1310 that includes the actuator pressure 1302 at the valve position 1304 of 0% and at the valve position 1304 of 100%. For example, the parameter calculator 220 may determine the actuator pressure 1302 at the valve position 1304 of 0% to be approximately 7 PSIG based on the plot 1300. The parameter calculator 220 may determine the actuator pressure 1302 at the valve position 1304 of 100% to be approximately 28 PSIG based on the plot 1300. The parameter calculator 220 may extrapolate a line between (1) the actuator pressure 1302 of 7 PSIG at the valve position 1304 of 0% and (2) the actuator pressure 1302 of 28 PSIG at the valve position 1304 of 100% to determine the line for the bench set estimate 1310.

In the illustrated example of FIG. 13, the VHM apparatus 100 calculates the baseline value for the two-times friction estimate 1312 by dividing the actuator pressure 1302 at a valve position 1304 on the line 1316 by the actuator pressure 1302 at the same valve position 1304 on the line 1318. For example, the parameter calculator 220 may calculate the baseline value for the two-times friction estimate 1312 at the valve position 1304 of 40% by dividing the actuator pressure 1302 for the line 1316 (e.g., approximately 20 PSIG) by the actuator pressure 1302 for the line 1318 (e.g., approximately 15 PSIG) at the valve position 1304 of 40%. For example, the parameter calculator 220 may calculate the baseline value for the two-times friction estimate 1312 at the valve position 1304 of 40% to be approximately 1.33 (e.g., 20 PSIG÷15 PSIG≈1.33) based on the plot 1300. In some instances, the parameter calculator 220 may calculate the baseline value for the friction estimate by halving the baseline value for the two-times friction estimate 1312. For example, the parameter calculator 220 may calculate the baseline value for the friction estimate at the valve position 1304 of 40% to be approximately 0.67 (e.g., (20 PSIG÷15 PSIG)÷2≈0.67) based on the plot 1300.

In the illustrated example of FIG. 13, the VHM apparatus 100 calculates the baseline value for the spring rate by calculating a slope of the bench set estimate 1310 line. For example, the parameter calculator 220 may calculate the slope of the baseline values for the bench set estimate 1310 line to determine the baseline value for the spring rate for the valve 112 of FIG. 1. For example, the parameter calculator 220 may determine the actuator pressure 1302 at the valve position 1304 of 60% to be approximately 21 PSIG. The parameter calculator 220 may determine the actuator pressure 1302 at the valve position 1304 of 20% to be approximately 12 PSIG. The parameter calculator 220 may calculate the baseline value spring rate to be approximately 0.225 (e.g., (21 PSIG−12 PSIG)÷(60%−20%)≈0.225) based on the plot 1300.

In the illustrated example of FIG. 13, the VHM apparatus 100 calculates the baseline value for the available force estimate 1314 by calculating a difference between the actuator pressure 1302 at the valve position 1304 of 100% and the actuator pressure 1302 at the valve position 1304 of 99%. The baseline value for the available force estimate 1314 may be an amount of available pressure from a spring of the valve 112 to begin to close the valve 112 (e.g., an amount of force to move the valve 112 from the valve position of 100% open to the valve position of 99% open). For example, the parameter calculator 220 may determine the baseline value for the available force estimate 1314 to be approximately 3 PSIG (e.g., (37 PSIG at the valve position of 100%)−(34 PSIG at the valve position of 99%)=3 PSIG) based on the plot 1300.

Figure 14:
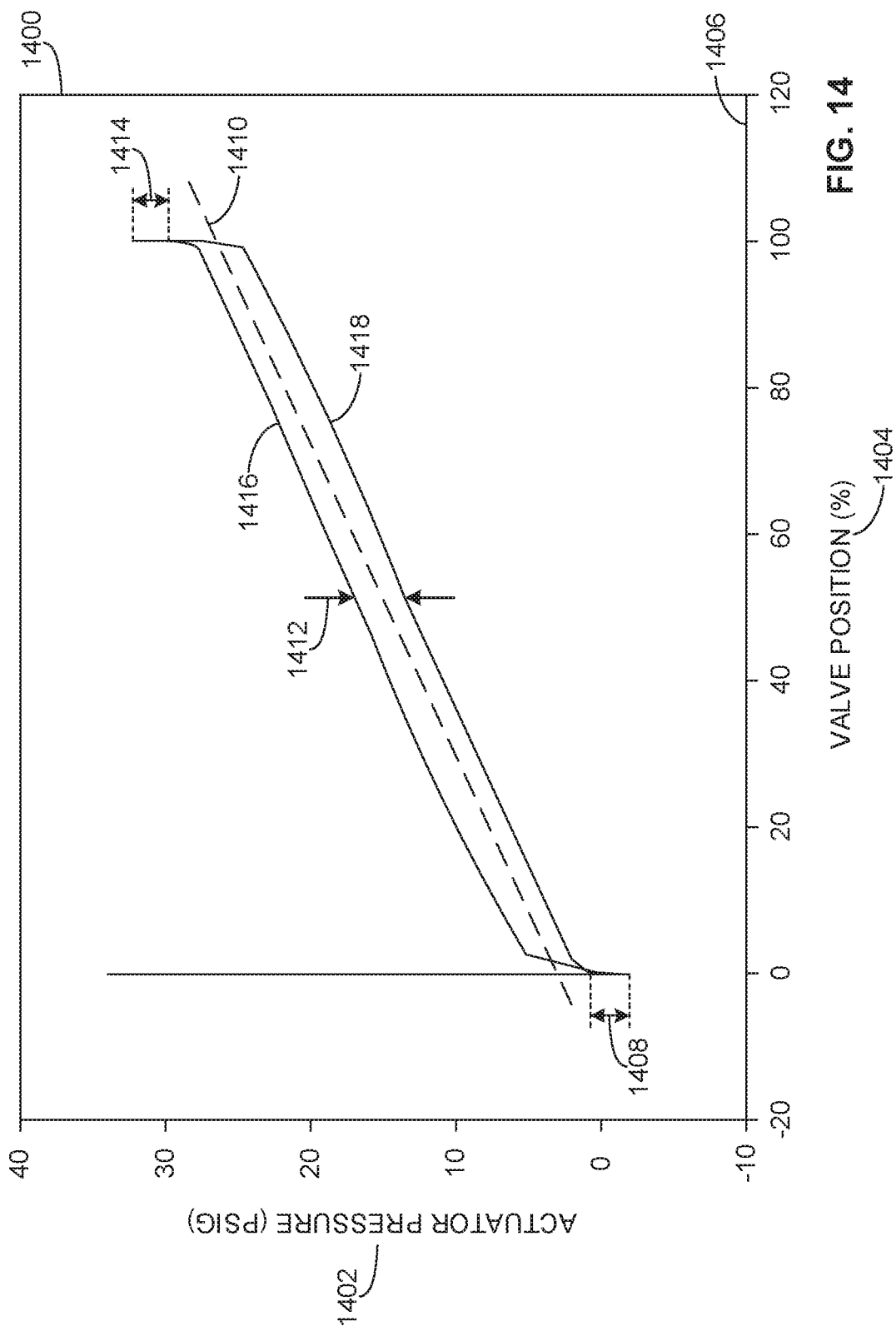
FIG. 14 is an example graph depicting health information of the valve of FIG. 13 during an operational process.

FIG. 14 is a graph depicting health information of a valve during an operational process. For example, the graph of FIG. 14 may depict operational health information of the valve assembly 108 of FIG. 1 obtained during normal operation. The graph of FIG. 14 depicts a plot 1400 of actuator pressure 1402 as a function of valve position 1404. The actuator pressure 1402 is in a unit of measure of pounds per square inch gauge (PSIG). The valve position 1404 is in a unit of measure of percentage. The valve position axis 1406 ranges from −20% to 120%, where 0% refers to the valve position 1404 of 0% open or fully closed and 100% refers to the valve position 1404 of 100% open or fully open.

In some examples, the VHM apparatus 100 develops the plot 1400 based on operational health information. For example, the parameter calculator 220 may develop the plot 1400 to calculate operational values for health parameters for the valve assembly 108. In some instances, the parameter calculator 220 produces the plot 1400 for every complete full-stroke operation (e.g., the valve 112 traveling from fully closed to fully opened and from fully opened back to fully closed) of the valve assembly 108 of FIG. 1 during an operational process. The parameter calculator 220 may calculate the health parameters such as, for example, a seat load estimate 1408, a bench set estimate 1410 (e.g., a theoretical actuator pressure estimate), a two-times friction estimate 1412, a friction estimate, a spring rate, an available force estimate 1414, etc. The VHM apparatus 100 may store the calculated health parameters in the database 210. For example, the parameter calculator 220 may store the operational values for the seat load estimate 1408, the bench set estimate 1410, the two-times friction estimate 1412, the friction estimate, the spring rate, the available force estimate 1414, etc. in the database 210.

In the illustrated example of FIG. 14, the parameter calculator 220 calculates the operational value for the seat load estimate 1408 by calculating a difference between the actuator pressure 1402 at the valve position 1404 of 1% and the actuator pressure 1402 at the valve position 1404 of 0%. The operational value for the seat load estimate 1408 may be an amount of pressure from a spring of the valve 112 if all actuator pressure 1402 was removed from the valve 112. For example, the parameter calculator 220 may determine the operational value for the seat load estimate to be approximately 3 PSIG (e.g., (1 PSIG at the valve position of 1%)−(−2 PSIG at the valve position of 0%)=3 PSIG) based on the plot 1400.

In the illustrated example of FIG. 14, the VHM apparatus 100 calculates the operational value for the bench set estimate 1410 based on the actuator pressure 1402 at the valve position 1404 of 0% and at the valve position 1404 of 100%. The example VHM apparatus 100 then extrapolates a line for the bench set estimate 1410 that includes the actuator pressure 1402 at the valve position 1404 of 0% and at the valve position 1404 of 100%. For example, the parameter calculator 220 may determine the actuator pressure 1402 at the valve position 1404 of 0% to be approximately 3 PSIG based on the plot 1400. The parameter calculator 220 may determine the actuator pressure 1402 at the valve position 1404 of 100% to be approximately 27 PSIG based on the plot 1400. The parameter calculator 220 may extrapolate a line between (1) the actuator pressure 1402 of 3 PSIG at the valve position 1404 of 0% and (2) the actuator pressure 1402 of 27 PSIG at the valve position 1404 of 100% to determine the line for the bench set estimate 1410.

In the illustrated example of FIG. 14, the VHM apparatus 100 calculates the operational value for the two-times friction estimate 1412 by dividing the actuator pressure 1402 at a valve position 1404 on the line 1416 by the actuator pressure 1402 at the same valve position 1404 on the line 1418. For example, the parameter calculator 220 may calculate the operational value for the two-times friction estimate 1412 at the valve position 1404 of 40% by dividing the actuator pressure 1402 for the line 1416 (e.g., approximately 15 PSIG) by the actuator pressure 1402 for the line 1418 (e.g., approximately 11 PSIG) at the valve position 1404 of 40%. For example, the parameter calculator 220 may calculate the operational value for the two-times friction estimate 1412 at the valve position 1404 of 40% to be approximately 1.36 (e.g., 15 PSIG÷11 PSIG≈1.36) based on the plot 1400. In some instances, the parameter calculator 220 may calculate the operational value for the friction estimate by halving the baseline value for the two-times friction estimate 1412. For example, the parameter calculator 220 may calculate the operational value for the friction estimate at the valve position 1404 of 40% to be approximately 0.68 (e.g., (15 PSIG÷11 PSIG)÷2≈0.68) based on the plot 1400.

In the illustrated example of FIG. 14, the VHM apparatus 100 calculates the operational value for the spring rate by calculating a slope of the bench set estimate 1410 line. For example, the parameter calculator 220 may calculate the slope of the operational values for the bench set estimate 1410 line to determine the operational value for the spring rate for the valve 112 of FIG. 1. For example, the parameter calculator 220 may determine the actuator pressure 1402 at the valve position 1404 of 60% to be approximately 17 PSIG. The parameter calculator 220 may determine the actuator pressure 1402 at the valve position 1404 of 20% to be approximately 8 PSIG. The parameter calculator 220 may calculate the operational value for the spring rate to be approximately 0.225 (e.g., (17 PSIG−7 PSIG)÷(60%−20%) ≈0.250) based on the plot 1400.

In the illustrated example of FIG. 14, the VHM apparatus 100 calculates the operational value for the available force estimate 1414 by calculating a difference between the actuator pressure 1402 at the valve position 1404 of 100% and the actuator pressure 1402 at the valve position 1404 of 99%. The operational value for the available force estimate 1414 may be an amount of available pressure from a spring of the valve 112 to begin to close the valve 112 (e.g., an amount of force to move the valve 112 from the valve position of 100% open to the valve position of 99% open). For example, the parameter calculator 220 may determine the operational value for the available force estimate 1414 to be approximately 2 PSIG (e.g., (32 PSIG at the valve position of 100%)−(30 PSIG at the valve position of 99%)=2 PSIG) based on the plot 1400.

FIG. 15 is an example table 1500 depicting example health information. For example, the table 1500 may depict the health information obtained during the baseline process of FIG. 13 and the operational process of FIG. 14. The table 1500 illustrates the example health information that may be obtained and/or processed by the VHM apparatus 100. For example, the VHM apparatus 100 may obtain and/or process the example health information shown in the table 1500 from the field device 104 for the valve assembly 108 of FIG. 1. The table 1500 depicts the example health information for health parameters such as, for example, a seat load estimate 1502, a bench set estimate at 0% valve position 1504, a friction estimate at 40% valve position 1506, a spring rate 1508, and an available force estimate 1510. Although five health parameters are listed in the table 1500, additionally or alternatively, there may be fewer or more than five health parameters obtained and/or processed by the VHM apparatus 100.

In the illustrated example of FIG. 15, the table 1500 depicts a baseline process column 1512, an operational process column 1514, an absolute value difference column 1516, and an alert threshold column 1518. The baseline process column 1512 details the example values for the health parameters obtained during a baseline process. For example, the baseline process column 1512 may detail the example values based on the plot 1300 of FIG. 13. The operational process column 1514 details the example values for the health parameters obtained during an operational process. For example, the operational process column 1514 may detail the example values based on the plot 1400 of FIG. 14. The absolute value difference column 1516 details example values where the values are calculated by determining the absolute value difference between the baseline process column 1512 and the operational process column 1514. Alternatively, the VHM apparatus 100 may determine a relative value difference between the baseline process column 1512 and the operational process column 1514, where the relative value difference may produce negative values.

In the illustrated example of FIG. 15, the table 1500 includes the alert threshold column 1518 to detail example values for health parameter threshold values that indicate a condition for generating an alert. For example, the alert generator 270 may generate the alert if a value in the absolute value difference column 1516 is greater than a value in the alert threshold column 1518. Alternatively, the alert generator 270 may generate the alert if a value in the operational process column 1514 is greater than or less than an allowable value. In some examples, the alert generator 270 employs a pre-defined threshold that may be dependent on user input. In some instances, the example alert generator 270 utilizes a calculated threshold. For example, the alert generator 270 may base the calculated threshold on one or more standard deviation values. For example, the values in the alert threshold column 1518 may be a result of determining a mean value and/or a standard deviation value associated with values obtained during a baseline process for the valve assembly 108 of FIG. 1. In another example, the values in the alert threshold column 1518 may be a result of user input.

In the illustrated example of FIG. 15, the table 1500 depicts the example health information that may be obtained and/or processed by the VHM apparatus 100. The VHM apparatus 100 may utilize the health information in the table 1500 to determine whether to generate the alert. In the illustrated example, a value for the seat load estimate 1502 during the baseline process is 5 PSIG and a value for the seat load estimate 1502 during the operational process is 3 PSIG. The absolute value difference between the baseline process value and the operational process value for the seat load estimate 1502 is 2 PSIG (e.g., 5 PSIG−3 PSIG=2 PSIG). In the illustrated example, the alert threshold value for the seat load estimate 1502 is 1 PSIG. In response to determining that the absolute value difference satisfies the alert threshold (e.g., the absolute value difference of 2 PSIG is greater than the alert threshold of 1 PSIG), the alert may be generated. For example, the alert generator 270 may generate the alert when the absolute value difference satisfies the alert threshold. The alert generator 270 may generate the alert such as, for example, sounding the alarm, propagating the alert message throughout a process control network, generating the failure log and/or the report, displaying the alert on a display, etc.

In the illustrated example of FIG. 15, a value for the friction estimate at 40% valve position 1506 during the baseline process is 0.67 and a value for the friction estimate at 40% valve position 1506 during the operational process is 0.68. The absolute value difference between the baseline process value and the operational process value for the friction estimate at 40% valve position 1506 is 0.01 (e.g., 0.68−0.67=0.01). In the illustrated example, the alert threshold value for the friction estimate at 40% valve position 1506 is 0.1. In response to determining that the absolute value difference does not satisfy the alert threshold (e.g., the absolute value difference of 0.01 is less than the alert threshold of 0.1), the alert may not be generated. For example, the alert generator 270 may not generate the alert when the absolute value difference does not satisfy the alert threshold.

Figure 16:
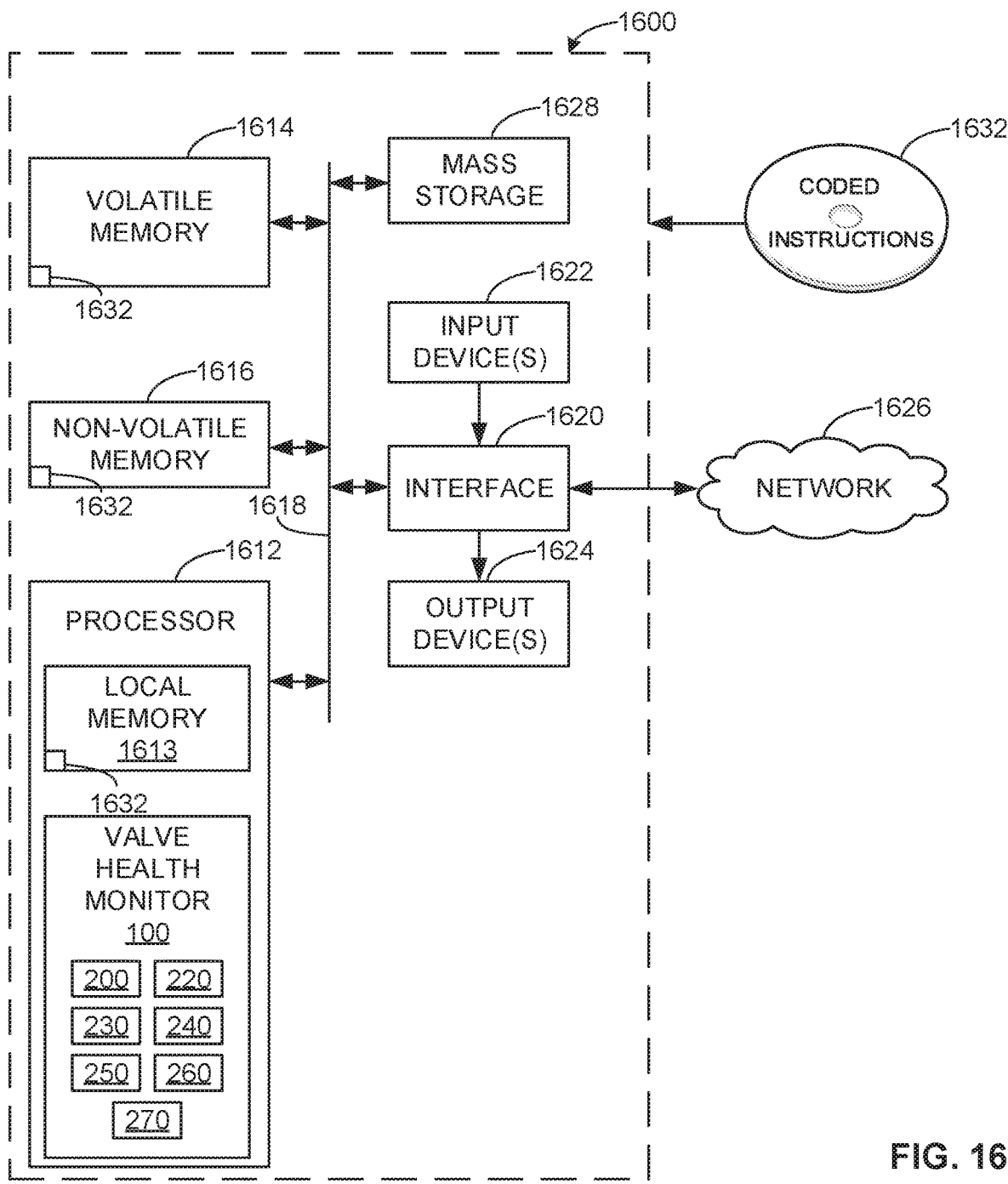
FIG. 16 is a block diagram of an example processor platform structured to execute machine readable instructions to implement the methods of FIGS. 3-12 and the example valve health monitor of FIGS. 1 and/or 2.

FIG. 16 is a block diagram of an example processor platform 1600 capable of executing instructions to implement the methods of FIGS. 3-12 and the apparatus of FIG. 2. The processor platform 1600 can be, for example, a programmable logic controller, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example executes the instructions to implement the example valve health monitor apparatus 100 comprising the example collection engine 200, the example parameter calculator 220, the example difference calculator 230, the example trend analyzer 240, the example outlier identifier 250, the example failure mode identifier 260, and the example alert generator 270. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614,1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip, or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, magnetic storage media, and digital versatile disk (DVD) drives. The example mass storage 1628 implements the example database 210.

The coded instructions 1632 of FIGS. 3-12 may be stored in the mass storage device 1628, in the volatile memory 1614, in the non-volatile memory 1616, and/or on a removable tangible computer readable storage medium such as a CD or DVD.

From the foregoing, it will appreciate that the above disclosed valve health monitor apparatus and methods provide prognostic health monitoring of a valve to monitor for a condition of the valve. As a result, the operating lifecycle of the valve can be optimized by operating the valve until the condition of the valve has been identified and avoid a premature replacement of the valve. Also, the identification of the condition of the valve generates an alert to personnel to allow the performance of preventative maintenance and/ or replacement of the valve prior to a potential failure that may produce unwanted downtime in a process control environment.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A system comprising:
   a field device in a process control network to monitor a valve, the field device to:
      measure a first operational value of a health parameter of the valve when the valve is at a first position; and
      measure a second operational value of the health parameter when the valve is at a second position; and
   a valve health monitor to be communicatively coupled to the field device, the valve health monitor to:
      in response to the valve being commanded to move from the first position to the second position, obtain operational health information from the field device during a time period spanning the valve moving from the first position to the second position, the first position different from the second position, the operational health information including the first operational value and the second operational value, the valve moving from the first position to the second position representative of a full-stroke valve operation of the valve;
      calculate a first difference between the first operational value and a first baseline value;
      calculate a second difference between the second operational value and a second baseline value;
      identify a condition of the valve based on at least one of (i) the first satisfying a first threshold or (ii) the second difference satisfying a second threshold; and
      send an alert via the process control network based on the condition of the valve.

2. The system of claim 1, wherein the field device is an electronic valve controller, the electronic valve controller in communication with a sensor and a valve positioner, and the electronic valve controller is to:
   measure the first operational value and the second operational value with the sensor; and
   measure the first position and the second position with the valve positioner.

3. The system of claim 1, wherein the valve is a butterfly valve or a gate valve.

4. The system of claim 1, wherein the operational health information is first operational health information, and the valve health monitor is to:
   obtain the first operational health information from the field device when the valve health monitor obtains first data acquisition trigger information from the field device, the first data acquisition trigger information including a first start data acquisition command, the first start data acquisition command including a first value corresponding to the valve beginning the full-stroke valve operation; and
   obtain second operational health information from the field device when the valve health monitor obtains second data acquisition trigger information from the field device, the second data acquisition trigger information including a second start data acquisition command, the second start data acquisition command including a second value corresponding to the valve ending the full-stroke valve operation.

5. The system of claim 1, wherein the operational health information includes at least one of a travel set point, a valve position, an actuator pressure, or a drive signal.

6. The system of claim 1, wherein the valve health monitor is to:
   obtain the first baseline value for the health parameter from a database, the first baseline value corresponding to the valve at the first position, the valve health monitor to store the database; and
   obtain a second baseline value for the health parameter from the database, the second baseline value corresponding to the valve at the second position.

7. The system of claim 6, wherein the valve health monitor is to determine whether at least one of (i) the first difference satisfies the first threshold or (ii) the second difference satisfies the second threshold.

8. The system of claim 1, wherein the first operational value and the second operational value for the health parameter is a dead time, a stroke time, a time constant parameter, or a gain value.

9. The system of claim 1, wherein the alert includes the condition of the valve, the alert indicative of a degradation of the valve.

10. The system of claim 1, wherein the valve is a first valve, and the valve health monitor is to obtain baseline health information from a second valve and calculate a third baseline value and a fourth baseline value for the health parameter of the first valve based on the baseline health information.

11. The system of claim 10, wherein the valve health monitor is to:
    calculate a third difference between the first operational value and the third baseline value;
    calculate a fourth difference between the second operational value and the fourth baseline value;
    determine whether at least one of the third difference or the fourth difference satisfies a respective one of the first threshold and the second threshold; and
    identify the condition of the valve in response to determining that at least one of the third difference or the fourth difference satisfies the respective one of the first threshold and the second threshold.

12. The system of claim 1, wherein the valve is a first valve, the operational health information is first operational health information, and the valve health monitor is to:
    obtain second operational health information from a second valve health monitor communicatively coupled to a second valve;
    compare the first operational health information to the second operational health information; and
    identify the condition of the first valve based on the comparison.

13. An apparatus comprising:
    at least one processor; and
    memory in communication with the at least one processor, the memory including computer readable instructions which, when executed, cause the at least one processor to at least:
       in response to a valve being commanded to move from a first position to a second position, obtain operational health information from the valve during a time period spanning the valve moving from the first position to the second position, the first position different from the second position, the valve moving from the first position to the second position representative of a full-stroke valve operation of the valve;
determine a first operational value for a health parameter of the valve based on the operational health information;
determine a second operational value for the health parameter based on the operational health information;
determine a first difference between the first operational value and a first baseline value;
determine a second difference between the second operational value and a second baseline value; and
identify a condition of the valve based on at least one of (i) the first difference satisfying a first threshold or (ii) the second difference satisfying a second threshold.

14. The apparatus of claim 13, wherein the at least one processor is to generate an alert, the alert including the condition, the condition indicative of a degradation of the valve.

15. The system of claim 1, wherein the valve health monitor is to:
determine a first timestamp at the first position;
obtain a third position of the valve from the field device, the third position between the first position and the second position;
determine a position difference between the first position and the third position;
in response to the position difference satisfying a position threshold, determine a second timestamp at the third position; and
determine a dead time of the valve based on a time difference between the first timestamp and the second timestamp.

16. A non-transitory computer readable storage medium comprising instructions that, when executed, cause at least one processor to at least:
obtain operational health information from a valve during a time period spanning the valve moving from a first position to a second position, the obtaining in response to a valve being commanded to move from the first position to the second position, the movement of the valve from the first position to the second position to be representative of a full-stroke valve operation of the valve;
determine a first operational value for a health parameter associated with the valve based on the operational health information;
determine a second operational value for the health parameter based on the operational health information;
determine a first difference between the first operational value and a first baseline value;
determine a second difference between the second operational value and a second baseline value; and
identify a condition of the valve based on at least one of (i) the first difference satisfying a first threshold or (ii) the second difference satisfying a second threshold.

17. The non-transitory computer readable storage medium of claim 16, wherein the instructions, when executed, cause the at least one processor to generate an alert, the alert to indicate the condition, the condition to indicate a degradation of the valve.

18. The non-transitory computer readable storage medium of claim 16,
wherein the instructions, when executed, cause the at least one processor to:
determine a first timestamp associated with the valve at the first position;
obtain a third position of the valve, the third position between the first position and the second position;
determine a position difference between the first position and the third position;
determine a second timestamp associated with the valve at the third position, the determining in response to the position difference satisfying a third threshold; and
determine a dead time associated with the valve based on a time difference between the first timestamp and the second timestamp.

19. The non-transitory computer readable storage medium of claim 16,
wherein first baseline health information includes the first baseline value and the second baseline value, the valve is a first valve, and the instructions, when executed, cause the at least one processor to:
obtain second baseline health information associated with a second valve; and
calculate a third baseline value and a fourth baseline value for the health parameter of the first valve based on the second baseline health information.

20. The non-transitory computer readable storage medium of claim 19, wherein the instructions, when executed, cause the at least one processor to:
calculate a third difference between the first operational value and the third baseline value;
calculate a fourth difference between the second operational value and the fourth baseline value;
determine whether at least one of the third difference or the fourth difference satisfies a respective one of the first threshold or the second threshold; and
identify the condition of the valve in response to determining that at least one of the third difference or the fourth difference satisfies the respective one of the first threshold or the second threshold.

* * * * *